(12) United States Patent
Lee et al.

(10) Patent No.: US 11,647,277 B2
(45) Date of Patent: May 9, 2023

(54) METHOD OF DYNAMIC IMAGE ADJUSTMENT IN AN ELECTRONIC DEVICE INCLUDING IMAGE SENSOR

(71) Applicant: SAMSUNG ELECTRONICS CO., LTD., Suwon-si (KR)

(72) Inventors: Yonggu Lee, Suwon-si (KR); Jeongyong Shin, Suwon-si (KR); Joonseo Yim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 224 days.

(21) Appl. No.: 16/848,602

(22) Filed: Apr. 14, 2020

(65) Prior Publication Data
US 2020/0382719 A1 Dec. 3, 2020

(30) Foreign Application Priority Data

May 31, 2019 (KR) .......... 10-2019-0064237
Nov. 29, 2019 (KR) .......... 10-2019-0156527

(51) Int. Cl.
*H04N 23/63* (2023.01)
*H04N 25/00* (2023.01)
*H04N 21/422* (2011.01)
*G06T 5/00* (2006.01)

(52) U.S. Cl.
CPC .......... *H04N 23/632* (2023.01); *H04N 25/00* (2023.01); *H04N 21/42224* (2013.01)

(58) Field of Classification Search
CPC ............. H04N 5/232935; H04N 5/335; H04N 21/42224; H04N 5/232125; H04N 5/23222; H04N 5/2351; H04N 5/243; H04N 5/23225; H04N 5/2226; H04N 5/23212; H04N 5/23216; H04N 5/232939; G06N 3/0454; G06N 3/08; G06N 20/00
USPC ...................................... 348/222.1
See application file for complete search history.

(56) References Cited

U.S. PATENT DOCUMENTS

| | | | |
|---|---|---|---|
| 9,153,031 B2 | 10/2015 | El-Saban et al. | |
| 9,596,407 B2 | 3/2017 | Saito | |
| 9,749,532 B1* | 8/2017 | Hinkel | H04N 5/35572 |
| 9,978,003 B2 | 5/2018 | Sachs et al. | |
| 10,198,621 B2 | 2/2019 | Takeda et al. | |
| 10,217,195 B1 | 2/2019 | Agrawal et al. | |
| 2008/0131019 A1* | 6/2008 | Ng | G06T 5/20 |
| | | | 382/255 |
| 2011/0221948 A1* | 9/2011 | Saito | H04N 1/0035 |
| | | | 348/333.01 |
| 2012/0069221 A1* | 3/2012 | Imai | H04N 23/65 |
| | | | 348/238 |
| 2016/0127636 A1* | 5/2016 | Ito | G06F 3/0486 |
| | | | 348/333.12 |
| 2016/0357400 A1* | 12/2016 | Penha | G06F 3/04842 |
| 2018/0249090 A1 | 8/2018 | Nakagawa et al. | |

(Continued)

*Primary Examiner* — Usman A Khan
(74) *Attorney, Agent, or Firm* — Volentine, Whitt & Francos, PLLC

(57) ABSTRACT

A method of operating an electronic device includes displaying a preview image in response to execution of a camera application, extracting feature information from the preview image, converting user input to an input value in response to the user input generated on the preview image, setting a depth based on the feature information and the input value, and generating a result image in accordance with the depth in response to execution of an imaging operation.

19 Claims, 24 Drawing Sheets

(56) References Cited

U.S. PATENT DOCUMENTS

2019/0080457 A1 3/2019 Shukla et al.
2019/0098235 A1 3/2019 Gilhotra et al.

* cited by examiner

| IMAGE | INPUT PARAMETER ||||| OUTPUT PARAMETER |
|---|---|---|---|---|---|---|
| | INPUT VALUE | ILLUMINATION | IMAGE INFORMATION |||  |
| | | | OBJECT | COMPOSITION | BACKGROUND | |
| FIRST IMAGE | 2.8 | 15000 | PERSON | CENTER | NATURE | 8 |
| SECOND IMAGE | 1.8 | 400 | PERSON | CENTER | INDOOR | 10 |
| THIRD IMAGE | 6.3 | 13000 | STRUCTURE | SIDE | CITY | 1 |
| FOURTH IMAGE | 3.6 | 6000 | ANIMAL | CENTER | SKY | 3 |

FIG. 17

METHOD OF DYNAMIC IMAGE ADJUSTMENT IN AN ELECTRONIC DEVICE INCLUDING IMAGE SENSOR

CROSS-REFERENCE TO RELATED APPLICATION(S)

This application claims priority to Korean Patent Application No. 10-2019-0156527 filed on Nov. 29, 2019 and Korean Patent Application No. 10-2019-0064237 filed on May 31, 2019 in the Korean Intellectual Property Office, the collective subject matter of which is hereby incorporated by reference.

BACKGROUND

Example embodiments of the inventive concept relate generally to methods of operating an electronic device including an image sensor.

An image sensor is a semiconductor device capable of generating electrical signal(s) in response to incident light received by an electronic device incorporating the image sensor. The image sensor may cooperate with other components to generate an image based on the electrical signal(s). Various image sensors have been employed in a variety of electronic devices. Recently, in order to improve the quality of images obtained by an image sensor and to generate images more satisfying to user demands, various additional functions have been added to the image sensor. Various applications, executable by the electronic device including an image sensor have also been developed.

SUMMARY

An example embodiment of the inventive concept provides a method of operating an electronic device which satisfies various user demands by determining a depth of a result image based on feature information obtained from a preview image and/or a user input occurring on a preview image, and the like.

According to an example embodiment of the inventive concept, a method of operating an electronic device includes displaying a preview image in response to execution of a camera application, extracting feature information from the preview image, converting user input to an input value in response to user input generated on the preview image, and setting a depth based on the feature information and the input value, and generating a result image in accordance with the depth in response to execution of an imaging operation.

According to an example embodiment of the present inventive concept, a method of operating an electronic device includes displaying an aperture icon having an aperture shape on a preview image in response to execution of a camera application, adjusting an opening area of the aperture icon displayed on the preview image in response to user input generated on the preview image, and adjusting blur strength of a background displayed on the preview image in response to user input.

According to an example embodiment of the present inventive concept, a method of operating an electronic device includes performing a learning operation of a machine learning model by applying feature information extracted from each of images stored in a memory as input parameters and applying blur strength extracted from each of the images as output parameters, extracting the feature information from a preview image in response to execution of a camera application, and inputting the feature information to the machine learning model, and determining blur strength of a background displayed on the preview image based on an output value of the machine learning model.

BRIEF DESCRIPTION OF DRAWINGS

The above and other aspects, features, and advantages of the present inventive concept will be more clearly understood from the following detailed description, taken in conjunction with the accompanying drawings, in which:

FIG. 17 is a chart listing nodal data from the neural network of FIG. 16;

DETAILED DESCRIPTION

Hereinafter, embodiments of the inventive concept will be described with reference to the accompanying drawings.

Figure 1A:
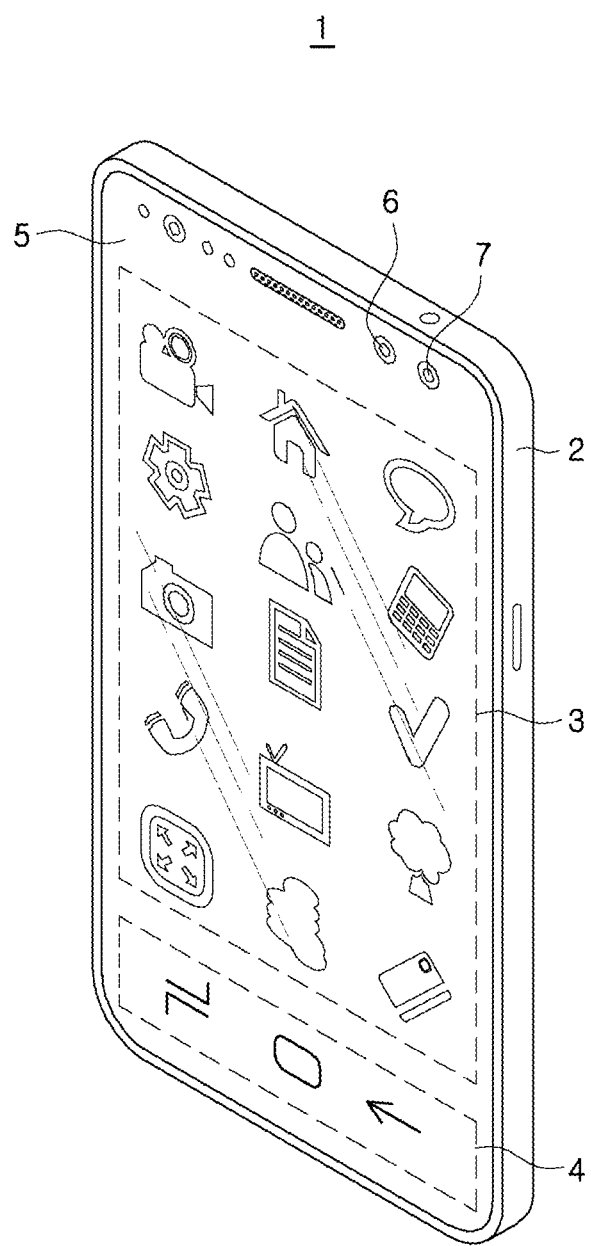
FIGS. 1A and 1B are respective diagrams illustrating an electronic device according to an example embodiment of the present inventive concept.
Figure 1B:
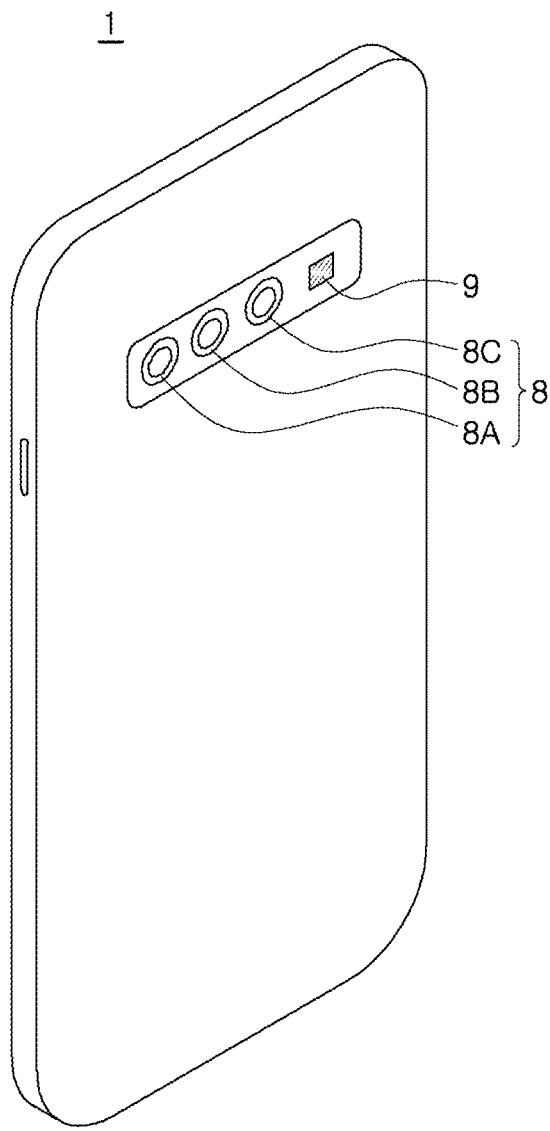

FIGS. 1A and 1B are diagrams illustrating an electronic device according to an example embodiment.

Referring to FIGS. 1A and 1B, an electronic device 1 may be implemented as a mobile device, such as a smartphone. However, the electronic device 1 is not limited to only mobile devices, such as a smartphone, but instead may include other devices providing a camera function for imaging an object.

The electronic device 1 illustrated in FIG. 1A includes a housing 2, a display 5 and cameras 6, 7 and 8, among other components. In the example embodiment, the display 5 substantially covers a front side of the housing 2. Here, the display 5 may be visually presented to provide one or more graphical user interface(s) GUI. For example, the display of FIG. 1A is shown divided into a first region 3 and a second region 4, In a manner well recognized by those skilled in the art, a user may interact (or manipulate) one or more icons presented by the GUI to provide user input to the electronics device 1. In response to user input one or more application(s) loaded to the electronic device 1 may be selectively executed (or performed).

Referring to FIG. 1A, certain front facing cameras provided by the electronic device 1 may include a first front facing camera 6 and a second front facing camera 7, wherein each front facing camera may operate according to respective, different characteristics. In this regard, those skilled in the art will recognize that cameras associated with electronic devices according to example embodiments may include an aperture (e.g., a controllable opening through which electromagnetic energy (e.g., visible light) may pass to become incident light on an image sensor). One example of different characteristics noted above is the degree to which a respective aperture is opened or closed.

As an example, the first front camera 6 and the second front camera 7 may have different aperture values, different focal lengths, different fields of view, and the like. In certain example embodiments, the first front camera 6 may be configured as a general camera, and the second front camera 7 may be configured as a time-of-flight (ToF) camera. When the second front camera 7 is configured as a ToF camera, it may be operationally combined with a light source to provide a distance measuring function, a depth-map generating function, a face recognition function, and the like.

FIG. 1B illustrates a rear side of the electronic device 1. Here, the electronic device 1 includes a rear facing camera 8 and a light emitting unit 9. The rear camera 8 may include a plurality of rear cameras (e.g., rear cameras 8A, 8B and 8C), wherein each rear facing camera may operate according to respective, different characteristics (e.g., aperture value, field of view, number of image sensor pixels, etc.). The light emitting unit 9 may include (e.g.,) one or more Light Emitting Diode(s) (LED) as a light source, and may operate as a camera flash element under the control of one or more application(s) or user input in relation to the rear camera 8.

With regard to the foregoing, those skilled in the art will understand that the terms "front" and "rear" are relative in nature and may be arbitrarily defined according to actual implementations of the electronics device 1.

With regard to the embodiment(s) illustrated in FIGS. 1A and 1B, the electronic device 1 may be variously implemented with a plurality of front and/or rear facing cameras 6, 7, 8A, 8B and 8C. In view of growing consumer demand variable and increasingly high quality images, the plurality of front and/or rear cameras 6, 7, 8A, 8B and 8C must typically be able to operate with different aperture values, different numbers of image sensor pixels, different fields of view, different focal lengths, etc. Further, greater user control (e.g., imaging functions) over the generation and display of images is demanded. For example, certain electronic devices 1 provide an imaging function wherein a user may provide user input in relation to a preview image displayed on the display 5. In response to the user input one or more camera applications may be executed on the electronic device 1 to variously adjust the preview image to generate a result image pleasing to the user.

Hereafter, the term "camera" will be generally used to denote the provision and/or use of one or more front facing and/or rear facing camera(s).

In certain embodiments, an aperture value of a camera capturing and providing a preview image may not be directly changed in response to a user input for adjusting an aperture value on the preview image. Instead, the electronic device 1 may execute an image processing application in response to user input in order to adjust the aperture value with respect to the preview image, such that the blur strength of a background portion of the preview image is reduced and/or a result image is improved relative to the preview image. Accordingly, the result image may be generated as if an aperture value of the camera and/or a depth value were changed in response to direct user input. In this regard, those skilled in the art will recognize that an image may be characterized by a particular depth. Depth is a term that denotes the visual perception range into an image. Depth may be referred to as "deep" or "shallow", but these are merely relative terms and may vary according to application or image perception requirements.

In contrast, when a user provides user input with respect to a preview image in order to adjust the aperture value, the electronic device 1 may collect feature information, such as composition information regarding an object and its associated background, information regarding an ambient environment, and the like. In response to the feature information, as well as the user input, a depth of the result image may be accurately generated. For example, imaging parameters optimized according to feature information and/or user input may be automatically set using a pre-stored look-up table and/or a machine learning model. That is, one or more learning operation(s) may be executed with respect to various feature information and/or user input in order to define appropriate (or user desired) imaging parameters. The imaging parameters set by the electronic device 1 may include a depth corresponding to blur strength of the background included in the result image, colors of the result image, etc. In certain embodiments, one or more look-up table(s) and/or machine learning model(s) may be used to generate result from preview images captured by the electronic device 1 under the control of the user, or previously captured and stored images.

Figure 2:
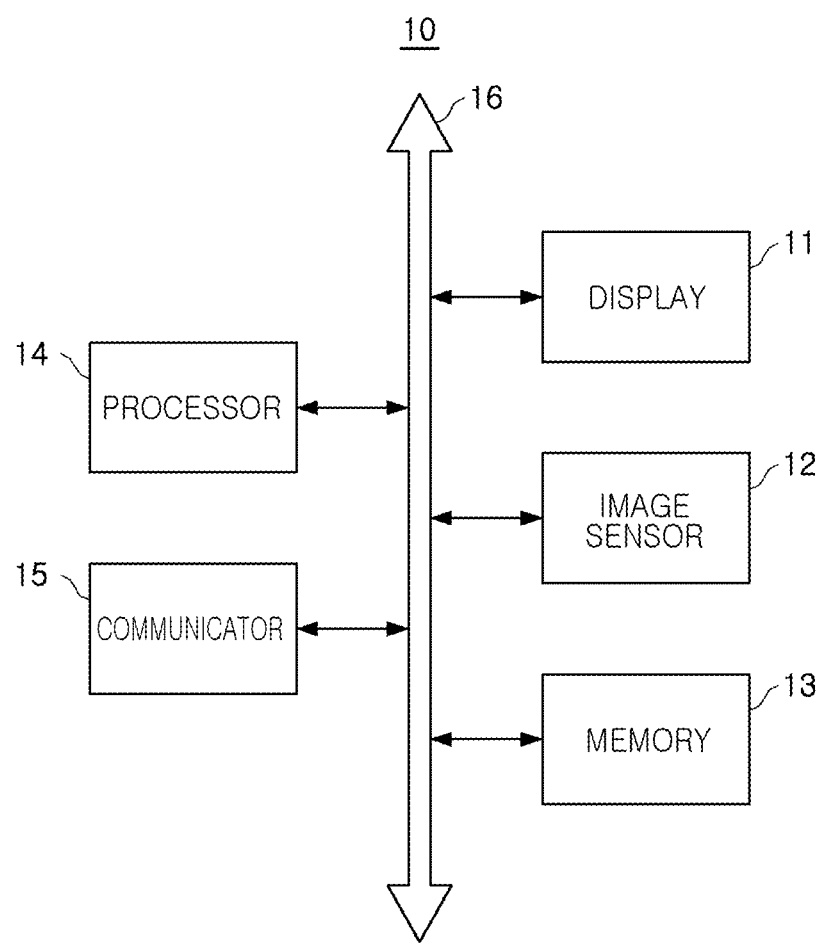
FIG. 2 is a block diagram illustrating an electronic device according to an example embodiment of the inventive concept.

FIG. 2 is a general block diagram illustrating an electronic device 10 according to an example embodiment.

Referring to FIG. 2, the electronic device 10 may include a display 11, an image sensor 12, a memory 13, a processor 14 and a communicator 15, among other components. Collectively, the elements 11, 12, 13, 14 and 15 included in the electronic device 10 may variously transmit and/or receive data using a bus 16. In this regard, the elements 11, 12, 13, 14, 15 and 16 illustrated in FIG. 2 are block level examples presented here to provide a descriptive context. The electronic device 10 may include additional elements as will be appreciated by those skilled in the art.

The image sensor 12 may be disposed on a front side and/or a rear side, or other regions of the electronic device 10 and may provide a camera function, as described above with reference to FIGS. 1A and 1B. The processor 14 may be configured as an application processor, a Central Processing Unit (CPU), or the like, and may be used to control the overall operation of the image sensor 12.

In response to user input, one or more camera applications running on the electronic device 10 may capture a preview image that is then displayed on the display 11. The user may then generate a result image from the preview image (e.g.) by touching a shutter icon displayed on a user interface (e.g., a GUI) together with the preview image on the display 11, or by imaging an object using an input unit arranged in the housing of the electronic device 10. In the example embodiment, a user interface by which a user may directly adjust blur strength of a background, and the like, displayed on the preview image may be displayed on the display 11 along with the preview image.

When a user provides user input via the user interface, the electronic device 10 may determine imaging parameters using various feature information (e.g., ambient environment information, background information for the preview image, and the like) along with the user input in order to generate a result image using the determined imaging parameters. As an example, the electronic device 10 may determine the imaging parameters using a look-up table stored in the memory 13 and/or a machine learning model stored, at least in part, in the memory 13.

As an example, the imaging parameters may include color(s), a focus depth (or depth), and other elements defining the result image. Here, a depth of the result image may change in response to user input provided by a user via the user interface. In the example embodiment, a degree of an out-focusing effect on a result image may be varied by the user input. Thus, the electronic device 10 may provide an imaging function, as if a desired depth were defined by directly opening and closing an aperture in a manually operated camera by the user input in response to the preview image. Also, by changing the user interface, an opening area of an aperture icon, for example, displayed on the preview image in response to the user input generated in relation to the preview image, changes in aperture value which may change a depth of the result image may be intuitively transferred to a user.

Figure 3:
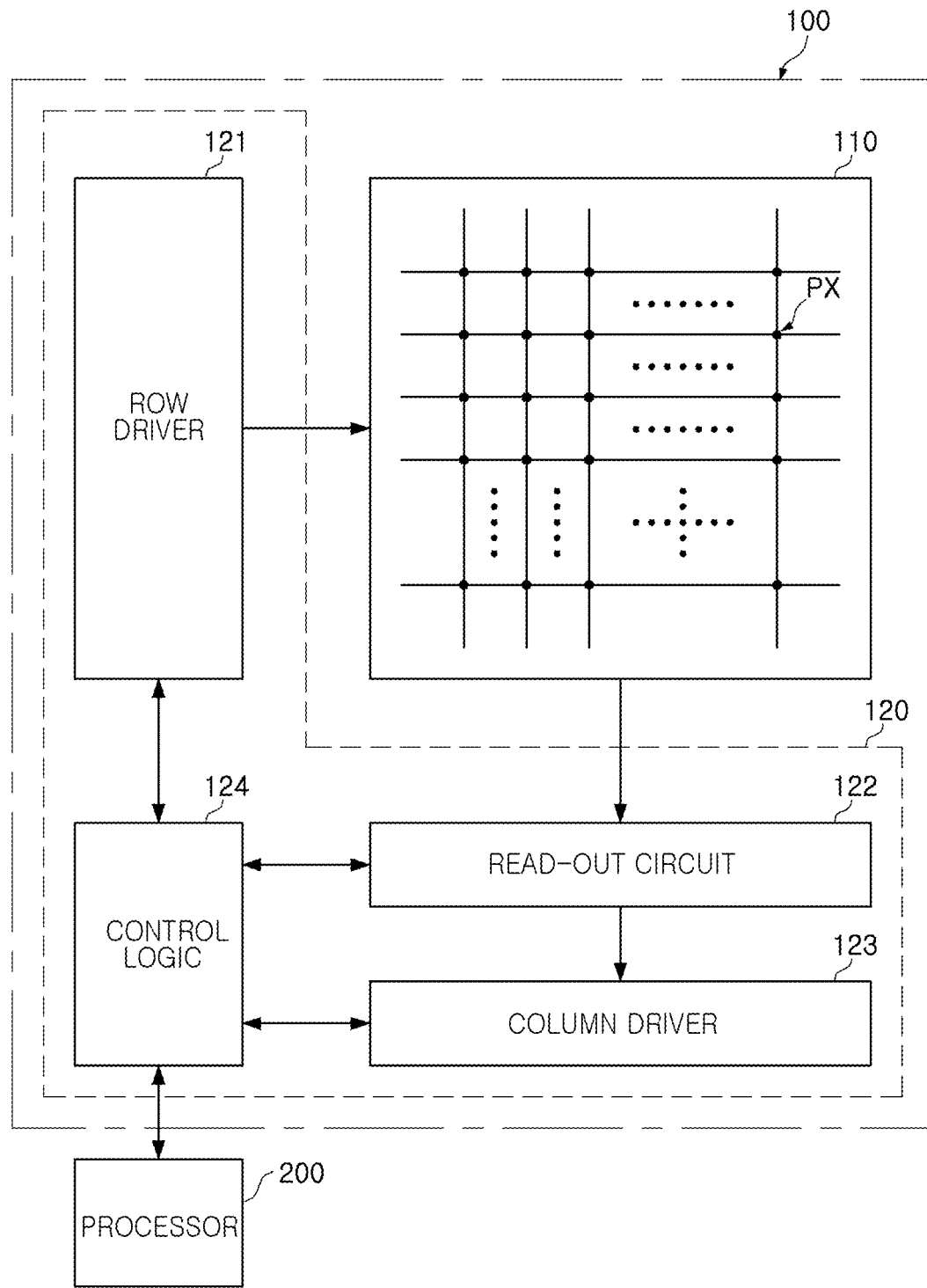
FIG. 3 is a block diagram further illustrating an image sensor according to an example embodiment of the inventive concept.

FIG. 3 is a block diagram illustrating an image sensor 100 according to an example embodiment.

Referring to FIG. 3, the image sensor 100 may include a pixel array 110 and a controller 120, wherein the controller 120 may include a row driver 121, a read-out circuit 122, a column driver 123 and a control logic 124, among other components.

The image sensor 100 may be used to convert incident light received by the electronic device 10 into corresponding electrical signal(s), such as image data. The pixel array 110 included in the image sensor 100 may include a plurality of pixels PX, wherein each pixel PX in the plurality of pixels PX includes at least one photoelectric device generating electric charges in response to received incident light. Here, the photoelectric device may be a photodiode (PD), for example. In an example embodiment, each of the plurality of pixels PC may include two or more photodiodes. The two or more photodiodes may be included in each of the plurality of pixels PX for each of the pixels PX to generate pixel signals corresponding to a variety of colors or for the purpose of providing an autofocusing function.

Each of the plurality of pixels PX may include a pixel circuit for generating a pixel signal from electric charges generated by photodiodes. As an example, the pixel circuit may include a transfer transistor, a driver transistor, a select transistor, a reset transistor, and the like. The pixel circuit may detect a reset voltage and a pixel voltage from each of the plurality of pixels PX and may calculate a difference therebetween, thereby obtaining a pixel signal. In the pixel voltage, electric charges generated by the photodiodes included in each of the plurality of pixels PX may be reflected. In an example embodiment, two or more adjacent pixels PX may be included in a single pixel group, and the two or more adjacent pixels PX included in the pixel group may share at least a portion of the transfer transistor, the driver transistor, the select transistor, and the reset transistor.

The row driver 121 may drive the pixel array 110 according to row units. For example, the row driver 121 may generate a transfer control signal for controlling the transfer transistor, a reset control signal for controlling the reset transistor, a select control signal for controlling the select transistor, and the like, the transfer transistor, the reset transistor, and the select transistor included in the pixel circuit.

The read-out circuit 122 may include a sampling circuit, an analog-to-digital converter (ADC), and others. The sample circuit may include a plurality of samplers, and in an example embodiment, the sampler may be configured as a correlated double sampler (CDS). The sampler may be connected to the pixels PX included in a row line selected by the row driver 121 through column lines, and may detect a reset voltage and a pixel voltage from the respective pixels PX. The samplers may compare each of the reset voltage and the pixel voltage with a ramp voltage, and may output a result of the comparison. The analog-to-digital converter may convert the result of the comparison output by the samplers to a digital signal and output the digital signal.

The column driver 123 may include a latch which may temporality store the digital signal, or a buffer circuit and an amplifier circuit, and may process the digital signal received from the read-out circuit 122. The row driver 121, the read-out circuit 122, and the column driver 123 may be controlled by the control logic 124. The control logic 124 may include a timing controller for controlling an operation timing of the row driver 121, the read-out circuit 122, and the column driver 123, an image signal processor for processing image data, and others.

In example embodiments, the image signal processor for processing image data may be included in a processor 150. The processor 150 may process image data and may generate a result image, and may perform operations of displaying the result image on a display or storing the result image in a memory.

At least one of the controller 120 and the processor 150 of the image sensor 100 may change an imaging parameter which may determine characteristics of the result image on the basis of a user input generated in relation to the preview image and/or feature information. As an example, the imaging parameter may include blur strength representing a depth of the result image, and the like. For example, when the blur strength increases, a background other than an area recognized as an object in the result image may be blurred such that a depth of the result image may become shallow. When the blur strength decreases, the background may become clear in the result image such that a depth may become deep.

A method of determining the imaging parameter in response to user input may vary with implementation of example embodiments. As an example, an imaging parameter corresponding to user input may be read from data pre-stored in a look-up table, wherein the imaging parameter is subsequently applied to the image sensor 100. Alternatively, an input value generated from user input may be input to a machine learning model, wherein a learning operation may be performed in advance and an resulting output applied to the image sensor 100 as the imaging parameter. In certain example embodiments, various forms of "feature information" (e.g., information regarding a particular type or shape of object being imaged, background information associated with at least a portion of a background for an image, composition information (e.g., the positioning of an object with respect to a background), ambient environment illumination, imaging time, imaging location, contrast ratios, color information (e.g., color temperature), etc.) may be input to the machine learning model together with an input value generated from user input.

Figure 4:
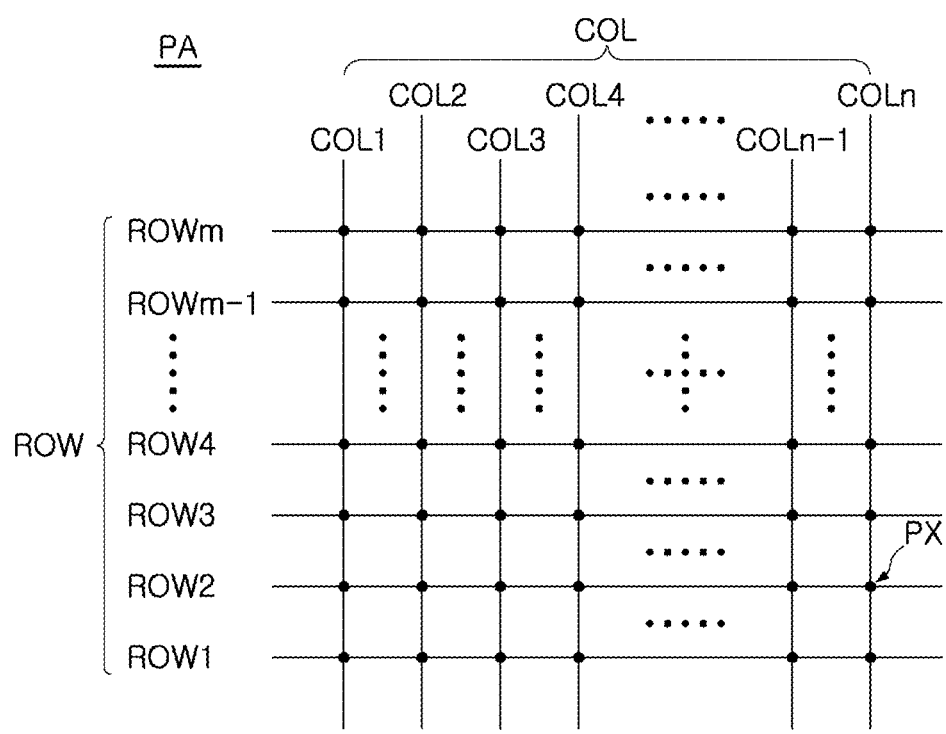
FIG. 4 is a diagram further illustrating a pixel array of an image sensor according to an example embodiment of the inventive concept.

FIG. 4 is a diagram further illustrating a portion of the pixel array 110 of FIG. 3 according to an example embodiment.

Referring to FIG. 4, a pixel array PA of an image sensor in the example embodiment may include a plurality of pixels PX. The plurality of pixels PX may be connected to a plurality of row lines ROW1 to ROWm (ROW) and a plurality of column lines COL1 to COLn (COL). The image sensor may drive the plurality of pixels PX by a plurality of row lines ROW unit. As an example, the time required for driving a selected driving line among the plurality of row lines ROW and reading out a reset voltage and a pixel voltage from pixels PX connected to the selected driving line may be defined as a single horizontal period. The image sensor may operate by a rolling shutter method for sequentially exposing pixels PX connected to the plurality of row lines ROW to light, respectively, or by a global shutter method for simultaneously exposing pixels connected to all the row lines ROW to light, or another method.

A frame period FT of the image sensor may be defined as time periods required for reading out a reset voltage and a pixel voltage from all the pixels included in the pixel array PA. As an example, the frame period FT may be the same as or greater than a product of the number of the plurality of row lines ROW and a horizontal period. The shorter the frame period FT of the image sensor, the more the image sensor may generate image frames for the same period of time.

Figure 5:
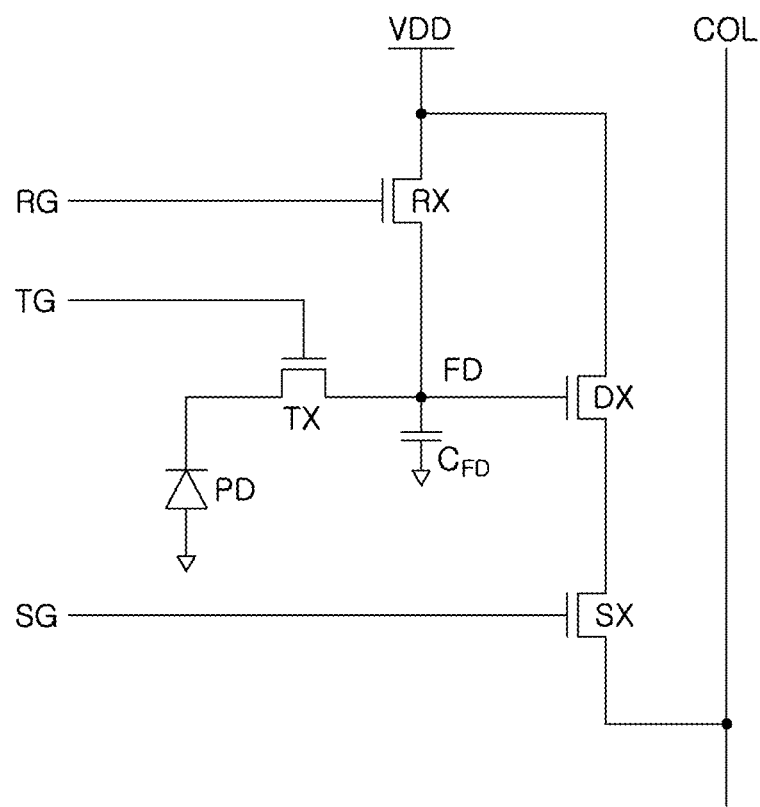
FIGS. 5 and 6 are respective circuit diagrams illustrating a pixel of an image sensor according to an example embodiment of the inventive concept.
Figure 6:
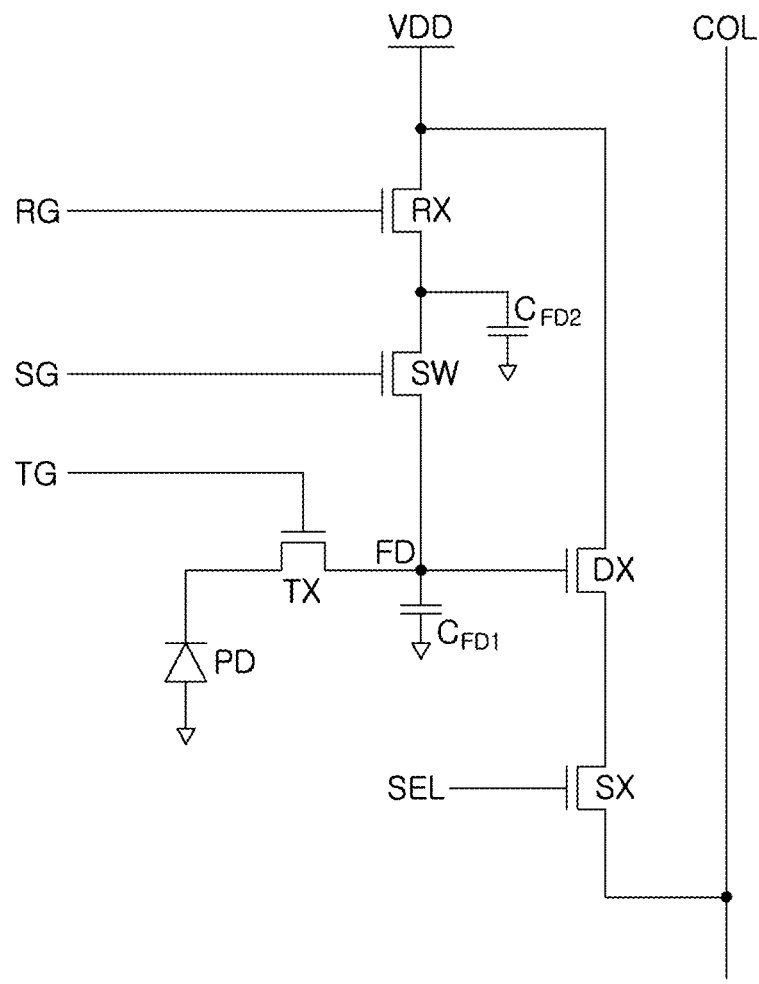

FIGS. 5 and 6 are circuit diagrams respectively illustrating possible implementations for a pixel that may be used in the pixel array 110 of an image sensor according to an example embodiment.

Referring to FIG. 5, pixels included in an image sensor may include a photodiode PD generating electric charges in response to light and a plurality of circuit devices for processing electric charges generated by the photodiode PD and outputting an electrical signal. As an example, the plurality of circuit devices may include a reset transistor RX, a driver transistor DX, a select transistor SX, and a transfer transistor TX.

The reset transistor RX may be turned ON and turned OFF by a reset control signal RG, and when the reset transistor RX is turned ON, a voltage of a floating diffusion FD may be reset to a power voltage VDD. When a voltage of the floating diffusion FD is reset, the select transistor SX may be turned ON by a select control signal SG and a reset voltage may be output to a column line Col.

In an example embodiment, the photodiode PD may generate an electron or a hole as a main charge carrier in response to light. After the reset voltage is output to the column line Col, and the transfer transistor TX is turned ON, electric charges generated by the photodiode PD being exposed to light may move to the floating diffusion FD. As an example, the electric charge generated by the photodiode PD may be stored in a capacitor CFD present in the floating diffusion PD. The driver transistor DX may operate as a source-follower amplifier amplifying a voltage of the floating diffusion FD, and when the select transistor SX is turned ON by the select control signal SG, a pixel voltage corresponding to the electric charge generated by the photodiode PD may be output to the column line Col.

Each of the reset voltage and the pixel voltage may be detected by a sampling circuit connected to the column line Col. The sampling circuit may include a plurality of samplers each including a first input terminal and a second input terminal, and the sampler may receive a ramp voltage through the first input terminal. The sampler may compare a ramp voltage input through the first input terminal with a reset voltage and a pixel voltage input through the second input terminal. An analog-to-digital converter (ADC) may be connected to an output terminal of the sampler, and the analog-to-digital converter may output reset data corresponding to a result of the comparison between the ramp voltage and the reset voltage, and pixel data corresponding to a result of the comparison between the ramp voltage and the pixel voltage. The control logic may generate image data using a pixel signal corresponding to a difference between the reset data and the pixel data.

In the example embodiment illustrated in FIG. 6, the pixel may include a photodiode PD, a reset transistor RX, a driver transistor DX, a select transistor SX, a transfer transistor TX, a switch device SW, and others. In the pixel circuit illustrated in FIG. 6, a conversion gain may be adjusted in response to turning on or turning off of the switch device SW.

The conversion gain of the pixel circuit may correspond to voltage changes generated by an electric charge, and may be inversely proportional to capacitance of a floating diffusion. In other words, when capacitance of the floating diffusion increases, a conversion gain of the pixel circuit may decrease. When capacitance of the floating diffusion decreases, a conversion gain of the pixel circuit may increase. Thus, a conversion gain may increase by turning on the switch device SW, and a conversion gain may decrease by turning off the switch device SW.

The conversion gain may affect performance of the image sensor. As an example, when a conversion gain of the pixel circuit is set to conform to a low illumination environment, a pixel voltage generated in a high illumination environment may exceed a dynamic range of the image sensor, and accordingly, quality of an image may be deteriorated. When a conversion gain of the pixel circuit is set to conform to a low illumination environment, the driver transistor DX may not sufficiently operate in a low illumination environment, and accordingly, a dark part of the image may not be sufficiently represented, or other issues may occur. In the example embodiment illustrated in FIG. 6, a conversion gain of the pixel circuit may be dynamically adjusted by turning on or turning off the switch device SW.

As an example, when the switch device SW is turned OFF, capacitance of the floating diffusion FD storing electric charges generated by the photodiode PD may be determined as first capacitance CFD1. When the switch device SW is turned ON, capacitance of the floating diffusion FD may be determined to be a sum of the first capacitance CFD1 and second capacitance CFD2. In other words, by turning off the switch device SW, capacitance of the floating diffusion FD may decrease, and a conversion gain may increase, and by turning on the switch device SW, capacitance of the floating diffusion FD may increase and a conversion gain may decrease.

Figure 7:
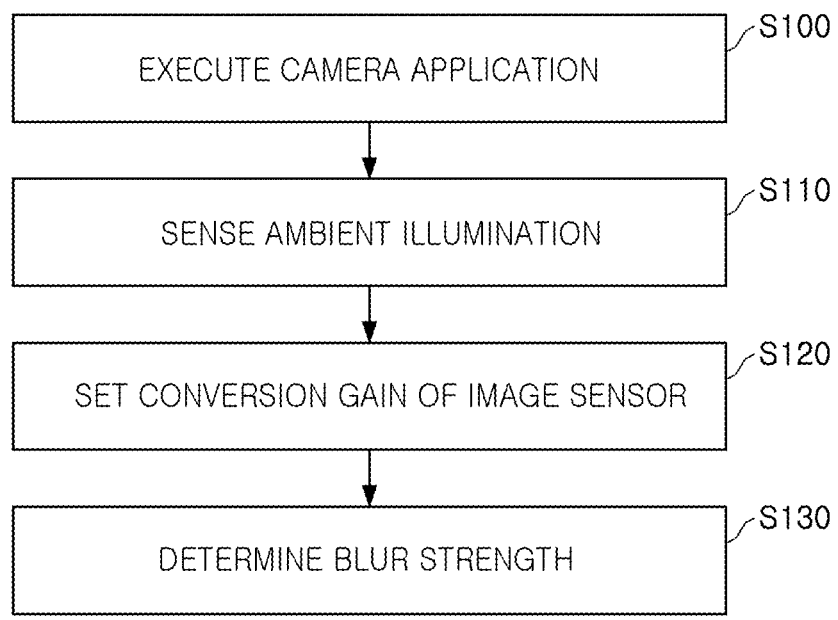
FIGS. 7, 8 and 9 are respective flowcharts summarizing methods, or method portions, of operating an electronic device according to an example embodiment of the inventive concept.
Figure 8:
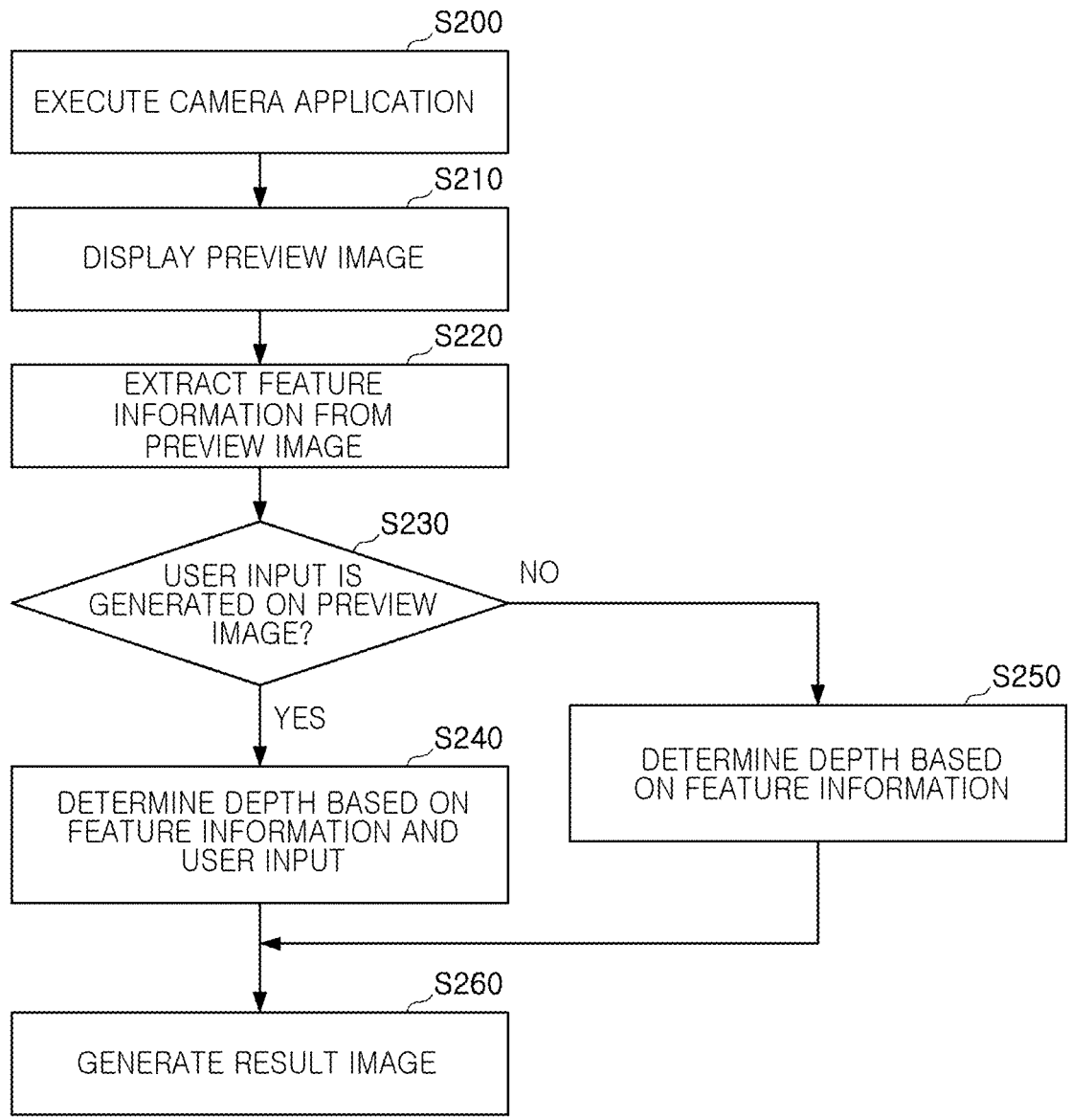
Figure 9:
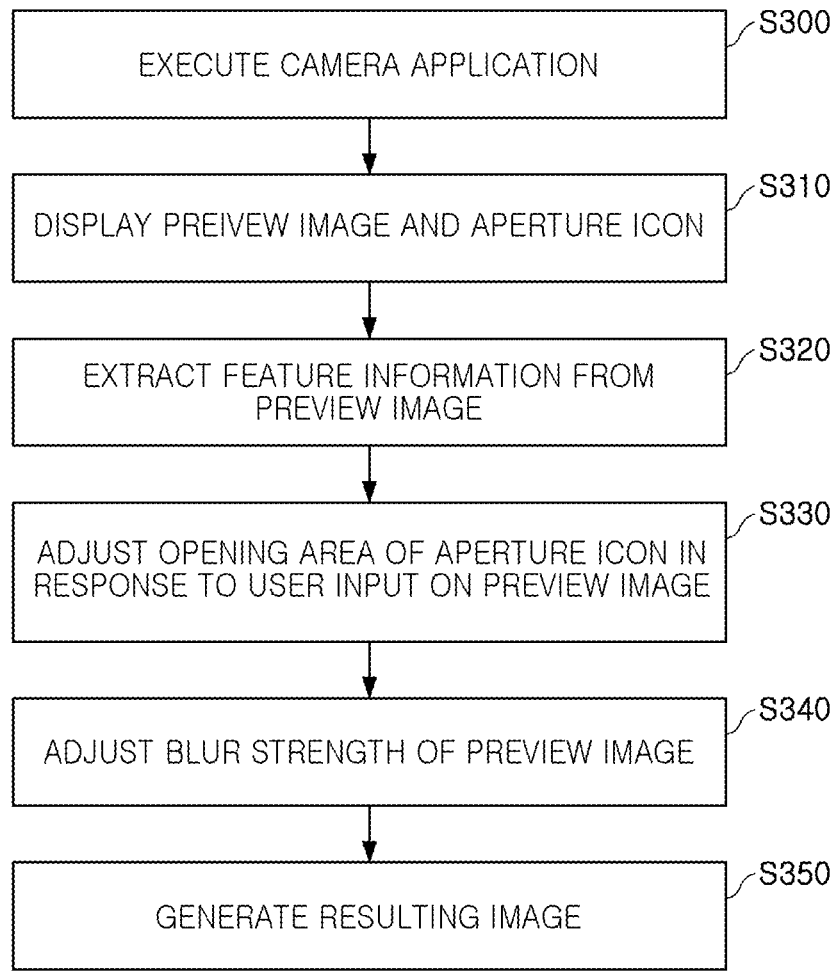

FIGS. 7, 8 and 9 are respective flowcharts illustrating methods of operating an electronic device according to various example embodiments.

Referring to FIGS. 2 and 7, a method of operating the electronic device 10 in the example embodiment is assumed to begin by a command or user input causing the execution of a camera application (S100). When the camera application is executed, the electronic device 10 may sense ambient illumination (e.g., the intensity of received incident light) (S110). The sensing of ambient illumination may be variously accomplished using one or more camera(s) and/or a light sensor integrated into the electronic device 10. In response to the sensed ambient illumination, the processor 14 of the electronic device 10 may be used to set a conversion gain for the image sensor 12 (S120). In one example embodiment, the electronic device may also collect various forms of feature information, such as color temperature information, ambient environment information, etc., while sensing the ambient illumination (S110).

In one approach, the conversion gain for the image sensor 12 may be determined in accordance with the capacitance of a floating diffusion region. As an example, when the sensed ambient illumination (S110) is relatively high, a conversion gain for the image sensor 12 may be relatively low, but when the sensed ambient illumination sensed (S110) is relatively low, a conversion gain for the image sensor 12 may be relatively high.

Once the conversion gain for the image sensor 12 is set (S120), the electronic device 10 may determine an appropriate blur strength to be applied to a result image (S130). Here, the electronic device 10 may reference a look-up table providing pre-stored data associated with blur strength. As an example, ambient illumination, conversion gain for the image sensor 12, and blur strength determined in accordance with the ambient illumination and conversion gain may be stored in a look-up table stored in memory 13.

In an example embodiment, the look-up table may be setup to increase conversion gain and thereby generate a result image with a relatively shallow depth when ambient illumination is relatively low. In this case, random noise properties of the result image obtained in a low illumination environment may improve. The look-up table may also be setup to decrease conversion gain and to thereby generate a result image with a deep depth when ambient illumination is relatively high. In this case, properties of a signal to noise ratio for the result image obtained in a high illumination environment may improve. However, an example embodiment thereof is not limited thereto, and the look-up table of memory 13 may be used to store various relationships among ambient illumination, conversion gain, and blur strength using a variety of approaches in response one or more preferences indicated by user input. As an example, the look-up table may be setup for a result image to be generated with a relatively shallow depth in a high illumination environment, or a relatively deep depth in a low illumination environment.

Referring to FIGS. 2 and 8, a method of operating the electronic device 10 in the example embodiment is again assumed to begin with the execution of a camera application (S200). When the camera application is executed, the electronic device 10 may display a preview image (S210) on the display 11, and use the processor 14 to extract various feature information associated with the preview image (S220).

The electronic device 10 may further determine whether user input is generated with respect to the preview image (S230). As an example, a user may generate user input while the preview image is displayed on the display 11 via a touch input capability provided by the display 11 of the electronic device 10 and/or manipulating mechanical keys provided by the electronic device 10.

When it is determined that user input is generated (S230+ YES), the electronic device 10 may further determine a depth on the basis of the feature information and the user input (S240). However, when it is determined that user input is not generated (S230=NO), the electronic device 10 may determine a depth based on the feature information (S250). However the depth is determined, a result image may be generated in response to an imaging function executed with respect to the preview image (S260). Alternatively, in the example embodiment, blur strength may be determined using the feature information extracted from the preview image, and the blur strength may be changed in accordance with a user input generated on the preview image. To improve user convenience, changes in blur strength, changing in accordance with the user, may be displayed on the preview image in real time.

In example embodiments, the electronic device 10 may change an actual aperture value of the camera. When it is possible to change an actual aperture value of the camera, the determined depth (S240) or (S250) may be displayed on the result image according to an actual aperture value of the camera. When the camera has a fixed aperture value, the determined depth (S240) or (S250) may be represented by increasing or decreasing blur strength applied to a background of the result image by an image processing operation. As an example, a shallow depth may be represented by increasing blur strength applied to a background, and a deep depth may be represented by decreasing blur strength applied to a background.

The electronic device 10 in the example embodiment may provide an input value generated in response to user input and/or feature information extracted from the preview image to input nodes of a machine learning model, such that a learning operation may be performed to determine blur strength using a value output to an output node of the machine learning model. The use of a machine learning model will be described in some additional detail hereafter.

The electronic device 10 in the example embodiment may adaptively determine a depth on the basis of user input generated with respect to the preview image and/or feature information extracted from the preview image. When a camera has a fixed aperture value, the depth may be represented on the result image by adjusting blur strength. In an example embodiment, a machine learning model, a learning operation of which is performed in advance, may be used to determine the blur strength, and accordingly, the result image based on an experience of a user may be provided to the user.

Referring to FIGS. 2 and 9, a method of operating an electronic device 10 in again assumed to begin with execution of a camera application (S300). When the camera application is executed, the electronic device 10 may display a preview image together with an aperture icon on the display 11 (S310). In an example embodiment, the aperture icon may have a shape representing or depicting an analog aperture for a manually operated camera.

As before, the electronic device 10 may be used to extract feature information from the preview image (S320). In the example embodiment, the electronic device 10 may determine blur strength applied to a result image on the basis of the feature information extracted (330) and may represent the blur strength of the preview image in advance.

The electronic device 10 may adjust an opening area of an aperture icon in response to user input generated with respect to the preview image (S330). As an example, a user may provide a touch input to the display 11 displaying the preview image and/or may adjust mechanical keys provided by the electronic device 10.

For example, an opening area of the aperture icon may increase in response to a first user input generated on the preview image. The opening area of the aperture icon may decrease in response to a second user input different from the first user input. As an example, the first user input may be a multi-touch input (or first finger gesture) for increasing a distance (or gap) between at least two fingers or a sliding gesture indicating sliding in a first direction. The second user input may also be a multi-touch input (or second finger gesture different from the first finger gesture) for decreasing a distance between at least two fingers, or a sliding gesture indicating sliding in a second direction opposite to the first direction.

In this regard, it should be noted that "user input" may take many different forms.

The electronic device 10 may adjust blur strength with respect to the preview image displayed on the display 11 in response to an input value generated by the user input and/or feature information extracted from the preview screen (S340). In the example embodiment illustrated in FIG. 9, blur strength applied to a background of the preview image may change in real time by the user input received in the electronic device while the preview screen is executed. When an imaging operation is executed by a user, a result image may be generated with blur strength of when the imaging operation is executed (S350). Thus, a user may execute the imaging operation after checking blur strength of a background to represent a depth desired by a user in advance, thereby obtaining a desired result image.

Figure 10:
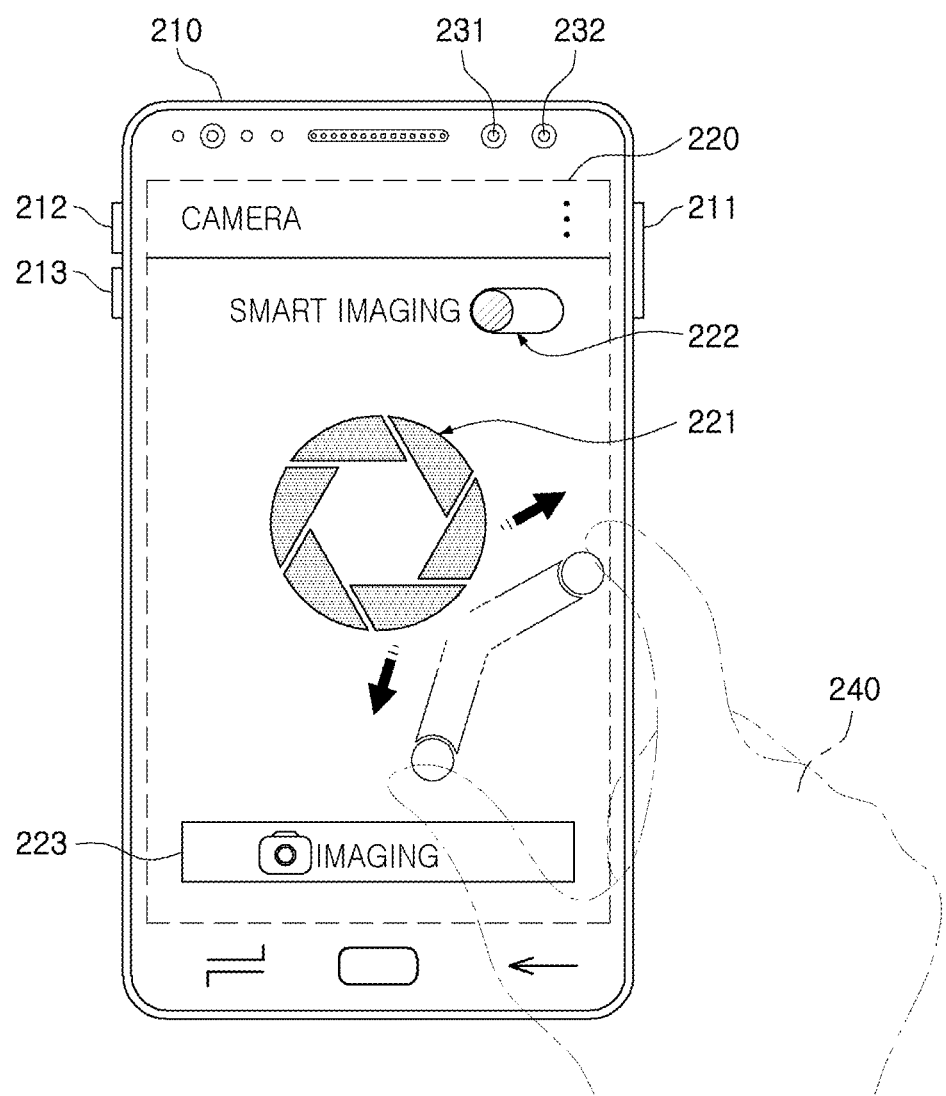
FIGS. 10 and 11 are respective diagrams illustrating a method of operating an electronic device according to an example embodiment of the inventive concept.
Figure 11:
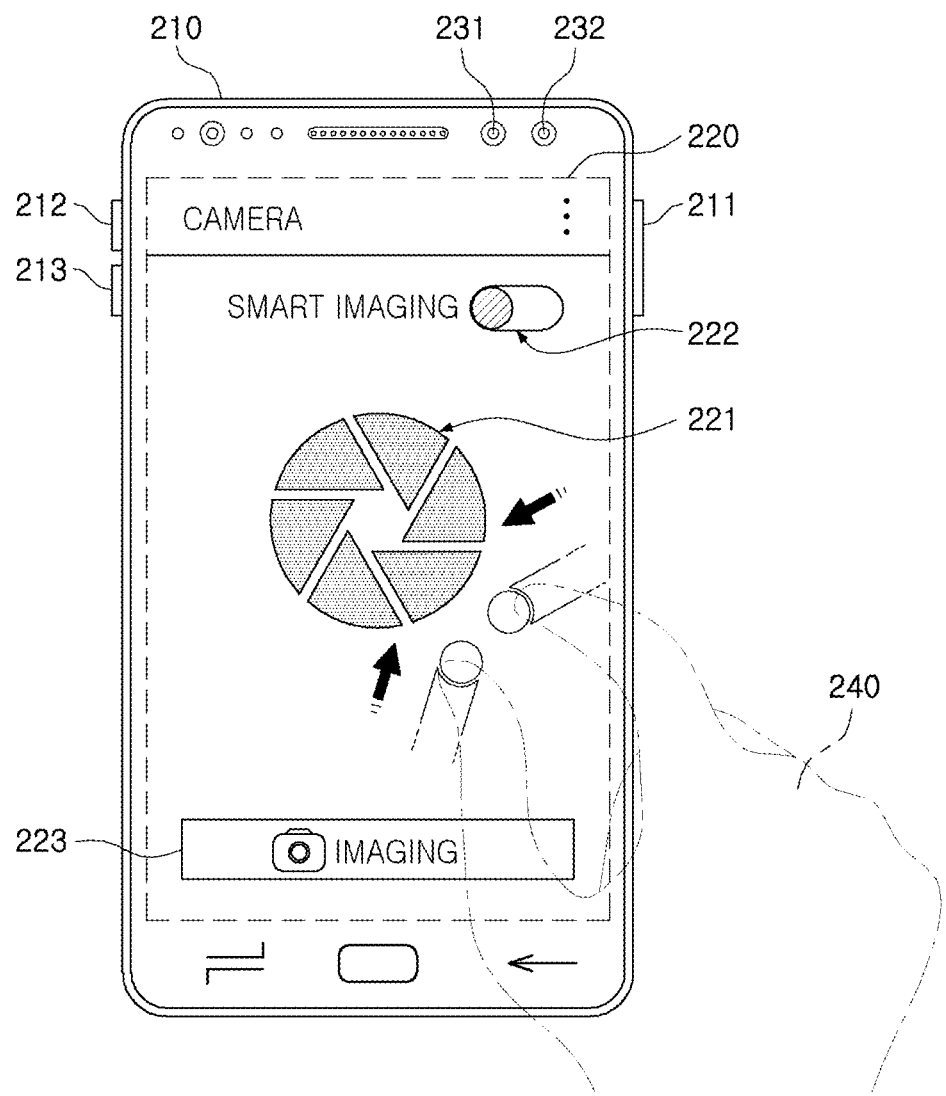

FIGS. 10 and 11 are respective diagrams illustrating a method of operating an electronic device according to an example embodiment.

In the example embodiment illustrated in FIGS. 10 and 11, a user may execute a camera application to image an object using an electronic device 200. The electronic device 200 may include a housing 210, a display 220, a front camera 231 and 232, and others, and the housing 210 may include one or more input buttons 211 to 213. As an example, the input buttons 211 to 213 may include a power button 211 and volume control buttons 212 and 213.

When the camera application is executed, the display 220 may display icons 221 to 223 illustrated in FIGS. 10 and 11. As an example, a first icon 221 may be configured to intuitively represent blur strength changing in accordance with a user input. The first icon 221 may have a shape of an aperture which appears to physically open/close like a manually operated camera, consistent with the methods illustrated in FIGS. 7 and 8.

Generally, in a manually operated camera, a depth may be determined in accordance with an aperture value of a camera, and blur strength of a background of an object may be determined in accordance with a depth. In an example embodiment, when user input for setting a depth to a shallow depth is generated, the opening area of the first icon 221 having an aperture shape may increase, and blur strength of the background may increase. When user input for setting a depth to a deep depth is generated, the opening area of the first icon 221 having an aperture shape may decrease, and blur strength of the background may decrease. Thus, an interface in which the depth of the result image may be controlled in the manner similar to the adjustment (opening or closing) of an aperture associated with a manually operated camera may be provided.

A second icon 222 may be configured to indicate whether a smart imaging function is activated. As an example, a user may activate or deactivate a smart imaging function by applying a touch input to the second icon 222. The smart imaging function may refer to an imaging function associated with certain example embodiments, and may be configured to provide an optimized result image with reference to a pre-stored look-up table, or the like, along with a user input corresponding to the second icon 222. A third icon 223 for obtaining a result image in response to a touch input by a user may be displayed on one side of the display 220.

In an example embodiment, a user may change an aperture value (i.e., the degree to which an aperture is opened or closed) by applying a first finger gesture 240 (e.g., selected from a group of possible finger gestures) to the display 220. Referring to FIG. 10, when a user inputs the first gesture by increasing a distance (or gap) between two fingers while touching the display 220, an opening area of the first icon 221 may increase. Thus, the opening area of the first icon 221 may correspond to an aperture value defined as an F value in a camera.

In contrast, when the user inputs a second gesture different from the first gesture by decreasing the distance (or gap) between two fingers while touching the display 220, the opening area of the first icon 221 may decrease. Referring to FIG. 11, as the user applies the second gesture, an opening area of the first icon 221 may decrease.

As will be appreciated by those skilled in the art, various finger gestures may be applied to a display as a touch input. Touch input is a widely used technique associated with various touch sensitive displays.

In an example embodiment, an opening area of the first icon 221 may increase or decrease in accordance with a user input, and at the same time, blur strength applied to a background of a preview image and a result image may also decrease or increase. As an example, as in the example embodiment illustrated in FIG. 10, when a user input for increasing an opening area of the first icon 221 is generated, blur strength of a background included in a preview image may increase. Accordingly, when an imaging function is executed while an opening area of the first icon 221 is increased, a result image with a stronger out-focusing effect may be generated. When a user input for decreasing an opening area of the first icon 221 is generated as in the example embodiment illustrated in FIG. 11, blur strength of the background displayed on the preview image may decrease. When an imaging function is executed while an opening area of the first icon 221 is decreased, a result image with a weaker out-focusing effect may be generated. The blur strength may be changed through an image processing operation executed by an electronic device (1 or 10).

A user input for adjusting an opening area of the first icon 221 may also be implemented by a different gesture other than the gesture of spreading or closing two fingers. As an example, when a user moves his/her finger in a first direction along a boundary of the display 220, an opening area of the first icon 221 may increase, and when the user moves his/her finger in a second direction opposite to the first direction, an opening area of the first icon 221 may decrease.

An aperture value may also be adjusted using at least a portion of the input buttons 211 to 213 included in the display 220. For example, an aperture value may increase when a volume increase button 212 is pressed, and an aperture value may decrease when a volume decrease button 213 is pressed. The volume control buttons 212 and 213 and an increase and a decrease of an aperture value may correspond to each other in a converse manner, differently from the above-described example. By assigning the function of adjusting an aperture value to the volume control buttons 212 and 213, an effect as if a user adjusts an aperture value while checking an overall preview image displayed on the display 220 may be provided, and the user may check changes in depth, changing in accordance with the adjusted aperture values.

In example embodiments, the first icon 221 having an aperture shape may not be provided on the preview image, or may be configured to have certain transparency. Also, if a user input is not generated on the preview image for a certain period of time, the first icon 221 may disappear and may not be displayed. When a touch input is generated on the preview image after the first icon 221 disappears, the first icon 221 may be displayed again. Also, to improve convenience in the imaging operation, a position of the first icon 221 displayed on the preview image may be directly adjusted by a user.

Figure 12:
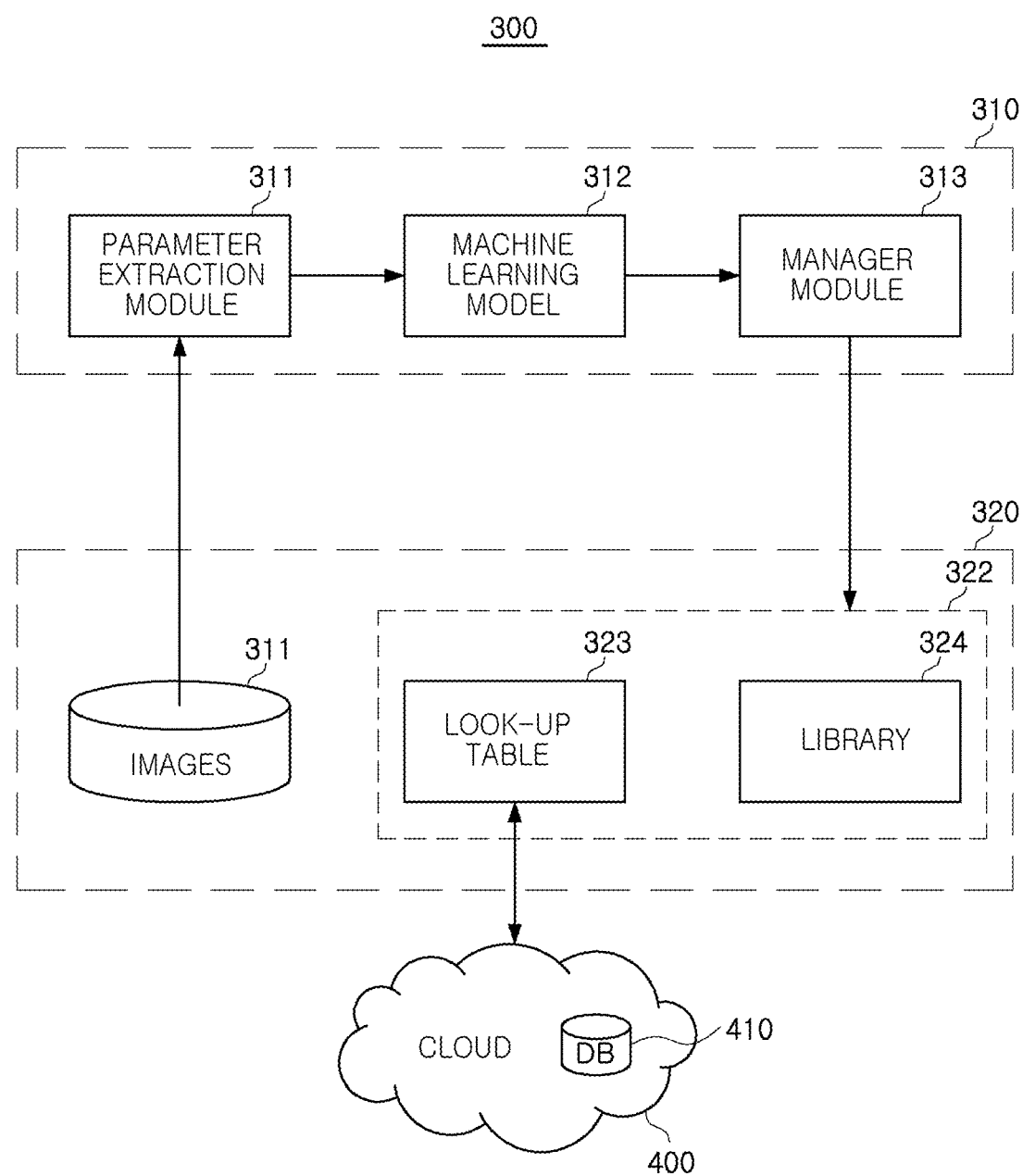
FIG. 12 is a block diagram illustrating operation of an electronic device according to an example embodiment of the inventive concept.

FIG. 12 is a block diagram illustrating possible additional approaches to the operation of an electronic device according to an example embodiment.

Referring to FIG. 12, an electronic device 300 may include a neural network framework 310 and a memory 320 among other components. The neural network framework 310 may be implemented in hardware, software, or combination of software and hardware. Images 321 taken by a user, as well as a parameter database 322 associated with the adjustment of imaging parameters for a camera and other elements, may be stored in the memory 320. In this regard, the memory 320 may take one of many different forms including both discrete memory components and/or distributed memory components.

In the illustrated example of FIG. 12, the parameter database 322 includes a look-up table 323 and a library 324 among other components. The look-up table 323 may be used to store (e.g.,) certain feature information associated with one or more image(s), as well as an input value corresponding to a user input. The combination of feature information and the input value may be used to determine blur strength which in turn may be used to determine a depth of a result image, etc. In an example embodiment, the look-up table 323 may be received by the electronic device 300 from a cloud 400 (e.g., a cloud based communication connection). Once received by the electronic device 300, the look-up table 323 may be stored in memory 320. In this manner, the electronic device 300 may receive new and/or updated data from the cloud 400 at predetermined update intervals or in response to a user input.

As an example, communication capabilities related to the cloud 400 may be provided by the electronic device 300, or a telecommunications service linked to the electronic device 300. The cloud 400 may be used to analyze images taken by one or more user once they are stored to the cloud 400. In this manner, a cloud-based database (DB) 410 may be generated in relation to the stored images. As an example, processing capabilities provided by the cloud 400 may classify the images and/or the users into defined groups according to feature information, for example. Feature information that may be used to classify images may include, for example, object information, background information, time information, location information, ages information, gender information, user information, etc. Whatever articular feature information is used, the cloud 400 may convert the feature information or aspects of the feature information into (e.g.,) one or more blur strengths that may be applied to image(s), image portion(s), filter(s), color(s), etc. Blur strength may be determined and applied in the cloud using the database 410, and may be selectively applied according to group(s).

When an update request for the look-up table 323 is received from the electronic device 300, the cloud 400 may extract (e.g.,) data appropriate to a user from the database 410 with reference to certain feature information associated with the stored image(s) in order to generate an updated (or new) look-up table 323. The updated look-up table 323 may thereafter be transferred to and stored by the electronic device 300. And since the look-up table 323 may be updated in accordance with indicated preferences and/or personalized feature information associated with a user (e.g., feature information previously indicated by user input in relation to images) performance of camera application(s) running on the electronic device 300 may improve.

The library 324 may be managed by the neural network framework 310, and blur strength determined by a machine learning model 312 as well as other parameters associated with camera operation may be included in the library 324. Hereafter, an exemplary learning process will be described in relation to the machine learning model 312 of the neural network framework 310, the library 324 and other components.

The neural network framework 310 may include a parameter extraction module 311, the machine learning model 312, a manager module 313, among other components. The parameter extraction module 311 may be used to calculate input parameters and output parameters for the learning operation of the machine learning model 312 from images 321 stored in the memory 320. The images 321 stored in the memory 320 may be configured as result images taken and stored by a user. These images may be added to or removed from the memory 320 according to user input.

As an example, the parameter extraction module 311 may obtain an input value corresponding to a user input generated on a preview image when an image is taken, as well as certain feature information associated with at least a portion of the images 321 stored in the memory 320. As an example, the input value may correspond to the user input generated on the preview image to directly adjust blur strength after an image is taken, and may be represented in numeral value such as an aperture value of a camera. And as previously noted, a great variety of feature information may also be referenced during this process. In another example, the parameter extraction module 311 may obtain information associated with one or more blur strength(s) for one or more images 321 stored in the memory 320.

The parameter extraction module 311 may apply (e.g., select and provide) certain feature information associated with selected images to input nodes of the machine learning model 312 as input parameter(s). As an example, the neural network framework 310 may control the machine learning model 312 to perform a learning operation such that output parameters provided at an output node of the machine learning model 312 accurately corresponds to blur strength indicating a depth of the respective image. For example, the neural network framework 310 may control the machine learning model 312 to perform a learning operation that respectively adjusts the weighting of values included in hidden nodes of a hidden layer associated with the machine learning model 312. Once the learning operation of the machine learning model 312 is complete, the manager module 313 may store the input parameter(s), output parameter(s), etc. associated with the machine learning model 312 in the library 324

As a user operates the electronic device 300, the catalog (e.g., a group, list or number) of images 321 stored in the memory 320 may change by the removal and/or addition of selected images. When it is confirmed that a certain catalog of images 321 stored in the memory 320 has changed sufficiently (i.e., has changed in relation to a particular value or number), the neural network framework 310 may control the machine learning model 312 to again perform the learning operation in order to appropriately update the library 324. Alternatively, after a certain amount of time has elapsed since a previous performing of a learning operation of the machine learning model 312, the neural network framework 310 may control the machine learning model 312 to again perform the learn operation and update the library 324.

In other words, in the example embodiment, the machine learning model 312 may be controlled to perform one or more learning operation(s) with reference to one or more images 321 stored in the memory 320. Further, when a user activates the smart imaging function described in relation to FIGS. 10 and 11, certain feature information (e.g.,) feature information extracted from a preview image) as well as input value(s) associated with user input generated in relation to the preview image may be applied to the machine learning model 312. In this manner, the electronic device 300 may provide a result image optimized according to user preference(s) with reference to an output of the machine learning model 312. As an example, the electronic device 300 may determine blur strength for the result image with reference to the output of the machine learning model 312 in order to appropriately adjust an out-focusing effect.

As an example, it may be assumed that among the images 321 previously taken and stored by a user, certain images include human figure(s) as objects against a background having a high illumination environment and shallow depth(s). As these depth(s) are relatively shallow, it may be determined that the user prefers a strong blur strength when an image includes a human figure and background characterized by a high illumination environment. Thus, when an object is a human figure and the associated background is a high illumination environment, the machine learning model 312 may be configured to perform the learning operation to output a strong blur strength resulting in a shallow depth. In this manner, the electronic device 300 may generate a result image having a shallow depth by increasing blur strength applied to the background with reference to the output of the machine learning model 312.

In contrast, other images 311 stored in the memory 320 may include a number of human figures as an object against a background having a low illumination environment and therefore a relatively deep depth. Here, since the depth is relatively deep, it may be determined that the user prefers weak blur strength when several figures are included as an objects in low illumination. When several human figures are recognized in the preview image or it is determined that illumination is low, the machine learning model 312 may output a weak (or reduced) blur strength. The electronic device 300 may generate a result image with a deep depth by decreasing blur strength of the background with reference to the output of the machine learning model 312.

Figure 13:
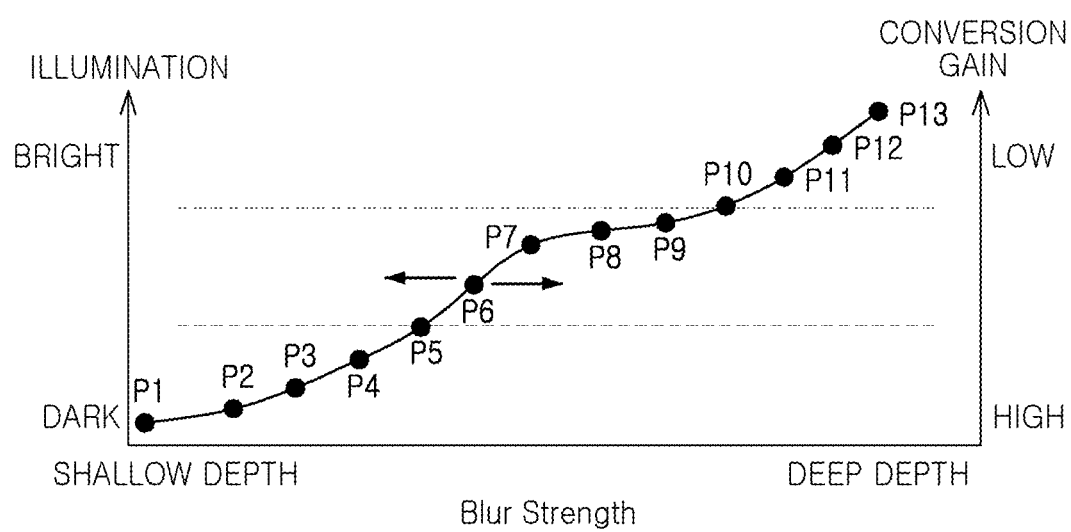
FIG. 13 is a chart illustrating data relationships that may be stored in a look-up table used in an electronic device according to an example embodiment of the inventive concept.

FIG. 13 is a chart illustrating a look-up table used in an electronic device according to an example embodiment.

Referring to FIGS. 12 and 13, the look-up table 323 stored in the memory 320 of the electronic device 300 may be used to certain relationship(s) (or ratios) between illumination level (varying from dark to bright) and blur strength (varying from shallow to deep). The selection of these relationships may be performed according to a selected group, category, or identified class of stored images. As an example, the electronic device 300 may generate a result image with a shallow depth as an aperture is open in low illumination environment, whereas the electronic device 300 may set to generate a result image with a deep depth as an aperture is closed in a high illumination environment. When a camera application is executed by the electronic device 300, blur strength used to obtain an optimal result image may be automatically set with reference to the illumination and blur strength relationship stored in the look-up table 323. In this regard, it should be noted that as blur strength changes, a Bokeh effect represented on the result image may also be vary.

Referring to an examples illustrated in FIGS. 12 and 13, blur strength of an image sensor may be varied in accordance with illumination level, and blur strength may also be varied in accordance with parameters other than illumination level, where such other parameter(s) may be stored in the look-up table 323. As an example, the depth of a result image determined on the basis based of illumination level and conversion gain may be stored in the look-up table 323.

Here, it should be noted that a conversion gain of the image sensor may increase as illumination is reduced, and decrease as illumination increases. Thus, by increasing conversion gain when illumination is low, a pixel signal having strength sufficient for generating an image in a relatively dark environment may be secured. Also, by decreasing conversion gain when illumination is high, the pixel signal will not become saturated. Thus, as conversion gain increases, a result image having a shallow depth may be generated, and as conversion gain decreases, the conversion gain and blur strength may be stored in the look-up table 323 to generate a result image with a deep depth.

The look-up table 323 may be generated with reference to a plurality of sample images. The look-up table 323 may be generated by collecting various aperture value(s), blur strength(s), and other feature information associated with the sample images. The look-up table 323 may be stored in the cloud 410, accessed by the electronic device 300 as required, updated by processing capabilities in the cloud 410, etc., such that the electronic device 300 may maintain an appropriately updated look-up table 23 associated with sample images and revised sample images over defined intervals or operating conditions.

In the example embodiment in FIG. 13, data used to generate a result image with an intermediate depth (e.g., chart elements P6, P7, and P8, for example) may be variously adjusted, (e.g.,) as tuning reference(s) and tuning direction for a constituent image sensor may be differently modified according to different manufacturers requirements. Nonetheless, the electronic device 300 may use the look-up table 323 to appropriately define blur strength corresponding to intermediate illumination environments, as well as intermediate conversion gain.

Figure 14:
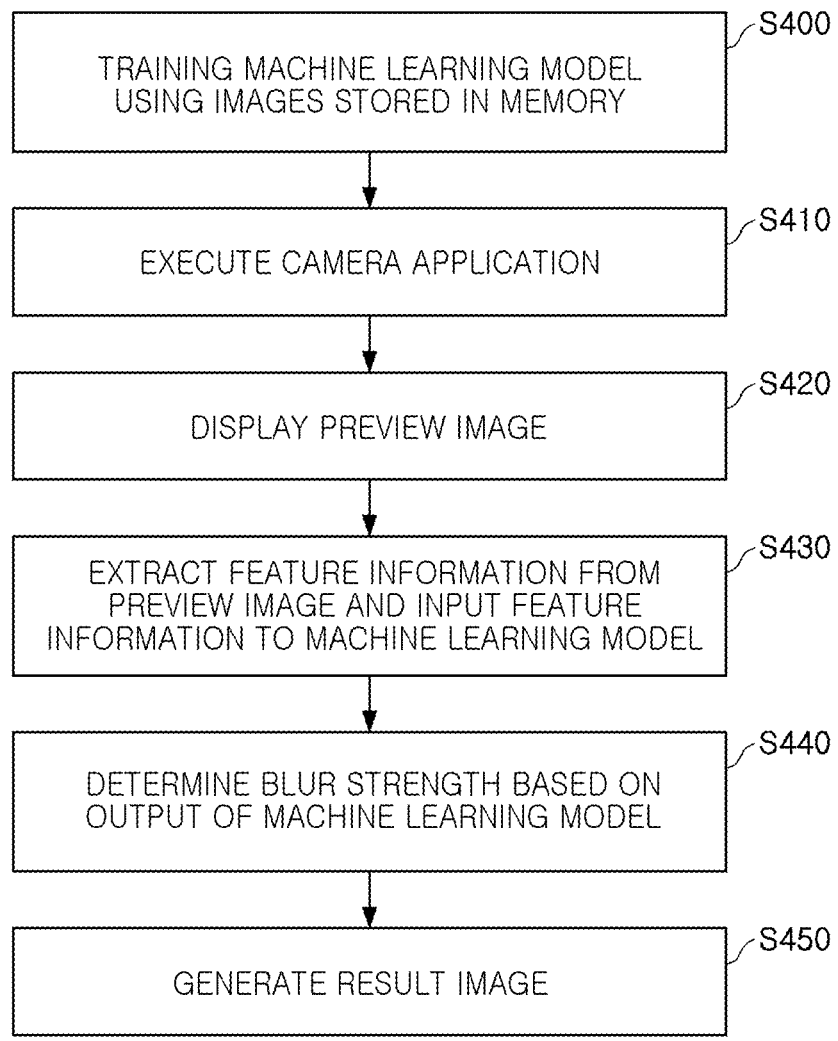
FIG. 14 is a flowchart summarizing a method of operating an electronic device according to an example embodiment of the inventive concept.

FIG. 14 is a flowchart summarizing in one example a method of operating an electronic device according to an example embodiment.

Referring to FIGS. 12 and 14, a method of operating the electronic device 300 may begin by training a machine learning model 312 using images 311 stored in the memory 320 (S400). Here, the training of the machine learning model 312 may be performed, at least in part, by extracting feature information associated with the images 311 or imaging parameters respectively associated with the images 311. The extracted feature information may then be applied as input parameters to the machine learning model 312 in order to determine a respective blur strength for the images 311 as output parameters. This training of the machine learning model 312 may be executed, for example, by the neural network framework 310.

Once the machine learning model has been trained (S400), a camera application may be executed by the electronic device 300 (S410), and a preview image may be displayed (S420). When the preview image is displayed, the electronic device 300 may extract feature information associated with the preview image and apply the extracted feature information to the machine learning model (S430). As an example, a method of extracting the feature information from the preview image (S430) may be the same as a method of extracting the feature information from each image stored in the memory 320 to perform the learning operation of the machine learning model in the operation S400.

The electronic device 300 may determine blur strength using an output of the machine learning model 312 which has received the extracted feature information (S440). Since the camera application is executed after the training of the machine learning model 312 is complete, the blur strength may be determined to correspond with the blur strength of an image that is the same as (or similar to) the preview image (440). Hence, the determined blur strength should be acceptable to the user, and a result image may be displayed in real time (S450). However, the user yet generate another result image by checking the blur strength represented on the result image by executing an imaging function.

Thus, if the blur strength determined by the machine learning model 312 is unacceptable, the user may generate a new input with respect to the preview image and adjust the blur strength accordingly.

Figure 15:
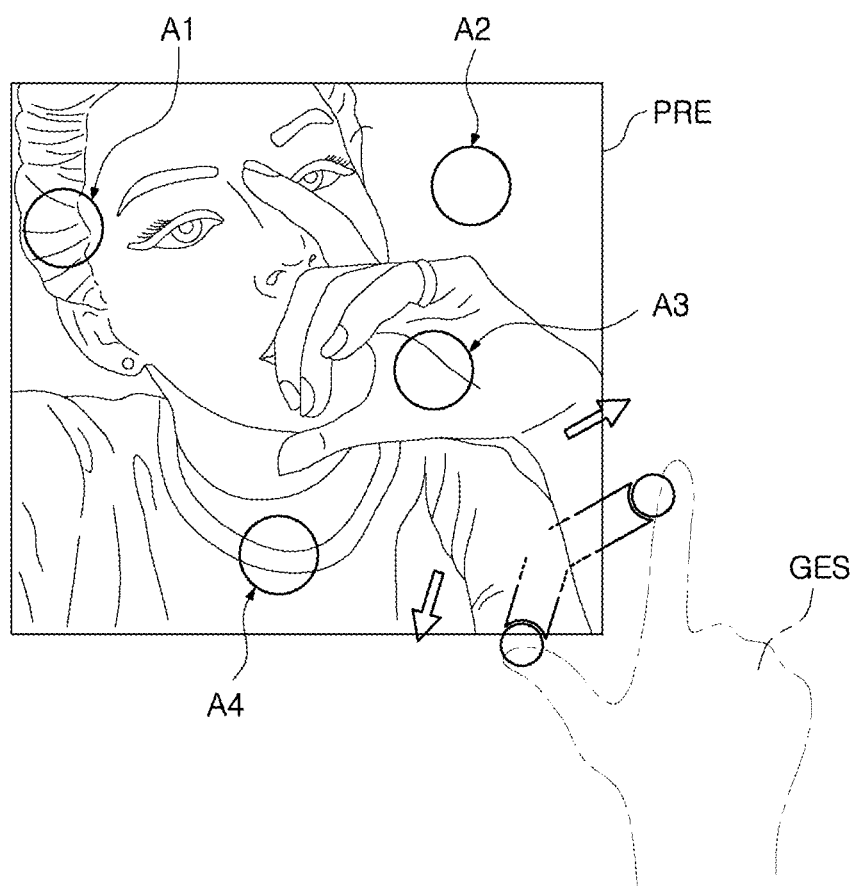
FIG. 15 is a diagram further illustrating a method of operating an electronic device according to an example embodiment of the inventive concept.

FIG. 15 is a conceptual diagram further illustrating a method of operating an electronic device according to another example embodiment.

Referring to FIG. 15, an electronic device (e.g., like the electronic devices shown in FIG. 1A, 1B, 2, or 12) may extract feature information from a plurality of regions (e.g., regions A1, A2, A3 and A4) indicated in a preview image PRE. The number of the plurality of regions may vary with application and the electronic device may obtain feature information from the plurality of regions.

Referring to FIGS. 12, 14 and 15, certain feature information from previously stored images 311 stored in memory 320 may be input to the machine learning model 312 and a training operation performed (S400). The machine learning model 312 may then receive feature information and provide blur strength appropriately required to generate a result image optimized to user preferences. The blur strength output by the machine learning model 312 may be reflected in the preview image PRE in real time. As an example, the blur strength may be blur strength applied to the background or portions of the background of the preview image PRE.

Here, if the user does is not satisfied with the determined blur strength, as now reflected in the preview image PRE, the blur strength may be further adjusted using user input such as a gesture input GES. For example, if the user determines that the blur strength reflected in the preview image PRE is too weak, the user may increase the blur strength using a gesture of spreading two or the user's fingers.

Figure 16:
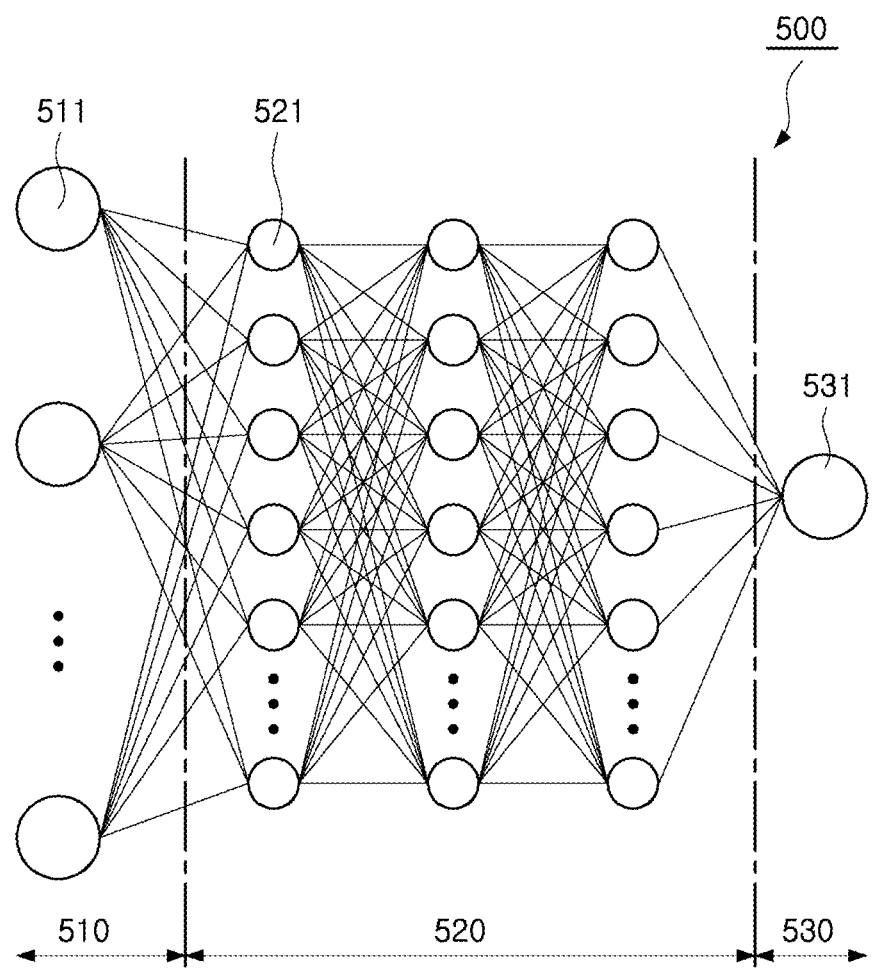
FIG. 16 is a diagram illustrating an artificial neural network that may be used in an electronic device according to an example embodiment of the inventive concept.

FIG. 16 is a conceptual diagram and FIG. 17 is a related chart illustrating a machine learning model (like the machine learning model of FIG. 12) that may be used to determine one or more imaging parameter(s) in accordance with an aperture value in an electronic device according to an example embodiment.

Referring to FIG. 16, a machine learning model 500 may include an input layer 510, a hidden layer 520, and an output layer 530. The input layer 510 may include a plurality of input nodes 511, the hidden layer 520 may include a plurality of hidden nodes 521, and the output layer 530 may include an output node 531. In an example embodiment, the output layer 530 may include a single output node 531. In example embodiments, the number of the output nodes 531 may be varied.

A plurality of input parameters may be input to the plurality of input nodes 511. The plurality of input parameters may correspond to feature information extracted from images previously taken by a user and stored in a memory of the electronic device. As an example, the plurality of input parameters may correspond to certain feature information like described above. Here, an input value may correspond to user input generated in relation to the preview image as well as feature information. That is, the input value may be determined by a user input generated by a user in relation to the preview image to adjust blur strength when an image is taken, and may be represented as an aperture value. The input value may not match an actual aperture value of a camera which has taken the respective image. For example, the user may generate an input on the preview image to set the strongest blur strength when taking a second image, and to set the weakest blur strength when taking a third image, and aperture values of the camera may be the same when the second image and the third image are taken.

When the above-mentioned feature information may be extracted from images stored in the memory of the electronic device and arranged in certain order(s) prior to being input to the plurality of input nodes 511, the hidden layer 520 of the machine learning model 500 may perform a certain calculation using values input to the input nodes 511, thereby exporting an output value to the output node 531. As an example, the hidden layer 520 may perform the above-mentioned calculation by adding up overall values input to a plurality of hidden nodes 521, respectively, by transferring 1 or 0 to a subsequent node when a sum of overall values input to the plurality of hidden nodes 521, respectively, is greater than a certain threshold, or by applying a certain weighting value to a value transferred among the plurality of hidden nodes 521.

In an example embodiment, an output value output to the output node 531 may correspond to blur strength representing a depth of the respective image. When the output value output to the output node 531 does not match blur strength representing an actual depth of the respective image, or a difference between the output value and the blur strength exceeds a certain reference, the machine learning model 500 may adjust the threshold value or the weighting value applied to the plurality of hidden nodes 521. The machine learning model 500 may repeat the learning process for adjusting the threshold value or the weighting value until the output value matches the blur strength representing an actual depth of the respective image or a difference between the output value and the blur strength is less than a certain reference. As an example, the above-described learning process may be performed on the images stored in the memory.

In the following description, a process of performing a learning operation for the machine learning model 500 using a first image, a second image, a third image and a fourth image stored in a memory of an electronic device will be described with reference to FIGS. 16 and 17. Referring to FIG. 17, certain feature information may be used to calculate one or more input parameter(s). For example, when input parameter(s) calculated from the first image are input to the input nodes 511 of the machine learning model 500, the learning operation of the machine learning model 500 may be performed to control an output value of the output node 531 to be 8 which indicates blur strength of the first image. Similarly, the input parameter(s) calculated from the second image are input to the input nodes 511 of the machine learning model 500, and the learning operation of the machine learning model 500 may be performed to control an output value of the output node 531 to be 10 which indicates blur strength of the second image. The learning process of the machine learning model 500 may include a process of adjusting weighting values applied to the hidden nodes 521, and the like.

In other words, when the input parameters obtained from each image stored in the electronic device are input to the machine learning model 500, the learning operation of the machine learning model 500 may be performed to control an output parameter of the machine learning model 500 to correspond to blur strength of each image. Thus, when a camera application is executed, and an aperture value, illumination, types of an object and a background, a composition, and others, are determined, the machine learning model 500 may output blur strength for generating a result image optimized to preference of a user.

In an example embodiment, when a camera application is executed, input parameters extracted from the preview image may be input to the machine learning model 500 having already been trained in order to determine an optimized blur strength, and accordingly, a result image with a depth preferred by a user may be provided. In example embodiments, the machine learning model 500 may also output values other than the blur strength, such as a color, a contact ratio, and the like, for example.

Figure 18:
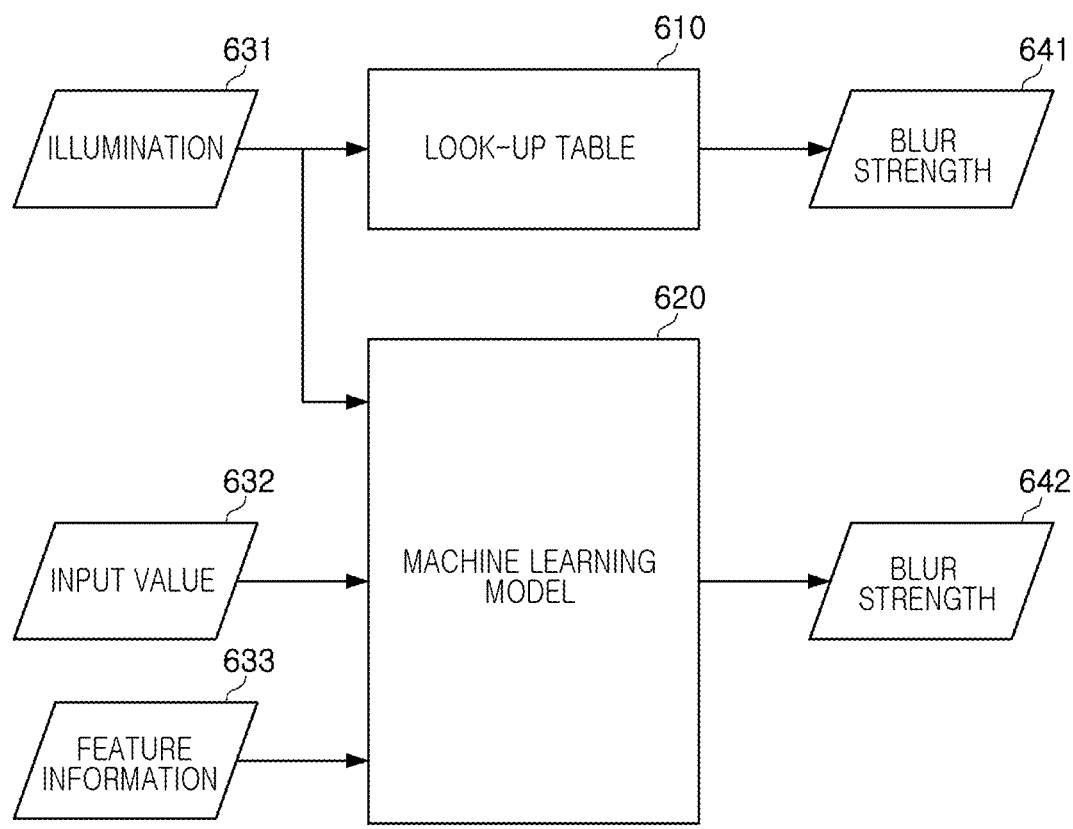
FIG. 18 is a block diagram illustrating an operation of an electronic device according to an example embodiment of the inventive concept.

FIG. 18 is a conceptual diagram further illustrating an operation of an electronic device according to an example embodiment.

Referring to FIG. 18, an electronic device 600 includes a look-up table 610 and a machine learning model 620 among other components.

When a camera application is executed, the electronic device may determine illumination 631. As an example, the illumination 631 may have a relatively high level outside on a clear day, for example. In contrast, the illumination 631 may have a relatively low level indoors on a cloudy day or at night. One or more values indicating the determined illumination 631 may then be applied to the look-up table 610 and the machine learning model 620. The look-up table 610 may output an appropriate blur strength 641 which determines a depth of a result image with reference to the illumination 631, and a conversion gain set in accordance with the illumination 631 in an image sensor.

When a camera application is executed, a function of directly adjusting an aperture value 632 on a preview image may be provided to a user. The input value 632 corresponding to a user input generated on the preview image may be represented as an aperture value. In some cases, an actual aperture value of the camera may not be changed by the input value 632. The input value 632 may be input to the machine learning model 620. The electronic device 600 may input feature information 633 obtained from the preview image to the machine learning model 620 in addition to the input value 632. As an example, the feature information 633 may include information on an object, information on a background, a composition of an object and a background, and other information. The machine learning model 620 may receive the illumination 631, the input value 632, the feature information 633, and other information, and may output blur strength which determines a depth of the result image.

The camera application may determine a depth of a result image taken by a user with reference to the look-up table 610 and blur strengths 641 and 642 output by the machine learning model 620. As an example, when the blur strengths 641 and 642 are relatively high, the camera application may process a background of an object to be blurred and may set a depth of a result image to be a shallow depth. When a plurality of image sensors are provided in the electronic device, a background may be processed to be blurred by calculating a depth of an object and a background using a phase difference of a signal output by the image sensors. When a single image sensor is provided, a background may be processed to be blurred by recognizing an outline of an object using a software algorithm.

In an example embodiment, the blur strength 641 output by the look-up table 610 may be determined by the illumination 631. As an example, when illumination is relatively low, a shallow depth may be applied, and blur strength may decrease. When illumination is relatively high, a deep depth may be applied, and blur strength may increase. However, an example embodiment thereof is not limited thereto, and a relationship between the blur strength 641 and the illumination 631 may be varied in accordance with data of the look-up table 610.

The blur strength 641 output by the machine learning model 620 may be determined by the input value 632, the feature information 633, and other information, in addition to the illumination 631. The learning operation of the machine learning model 620 may be performed on the basis of images taken in the past by a user and stored. Accordingly, the blur strength output by the machine learning model 620 may be dynamically determined in accordance with preference of the user. In the example embodiment, by using both of the blur strength 641 output by the look-up table 610 provided by a manufacturer of the electronic device and the blur strength 642 output by the machine learning model 620, an image having an optimized quality may be provided to a user.

Figure 19:
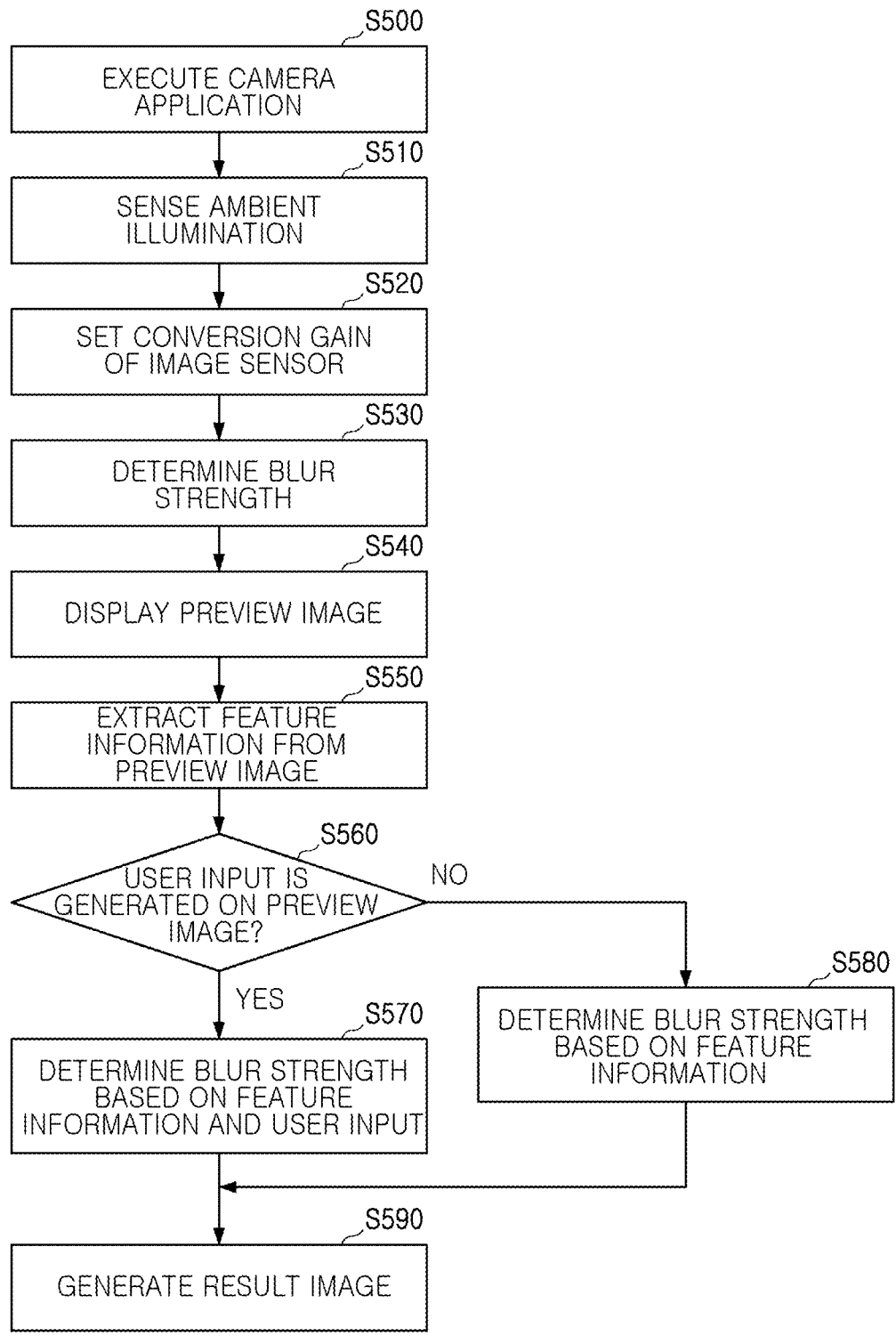
FIG. 19 is a flowchart summarizing a method of operating an electronic device according to an example embodiment of the inventive concept.

FIG. 19 is a flowchart summarizing a method of operating an electronic device according to an example embodiment.

Referring to FIG. 19, a method of operating an electronic device may begin with executing a camera application (S500) and sensing an ambient illumination environment (S510). Once illumination is sensed, a conversion gain for a constituent image sensor may be set in accordance with the illumination (S520). As described above, when ambient illumination is relatively high, a conversion gain may decrease, and when ambient illumination is relatively low, a conversion gain may increase. Also, the electronic device may determine blur strength (S530). The blur strength in the operation S530 may be determined by the look-up table stored in the electronic device. The look-up table may include data determining a relationship among ambient illumination, a conversion gain, and blur strength.

The electronic device may apply the blur strength determined in the operation S530 and may display a preview image (S540), and may extract feature information from the preview image (S550). A user may check the preview image in which the blur strength determined in the operation S530 is reflected, may determine whether to change the blur strength, and may generate a user input (S560). As an example, the user may generate a gesture input for increasing or decreasing the blur strength on the preview image.

When the user input is generated in the operation S560, the electronic device may determine blur strength on the basis of the input value corresponding to the user input and the feature information which has been extracted from the preview image (S570). When a user input is not generated in the operation S560, the electronic device may determine blur strength on the basis of the extracted feature information (S580). The blur strength determined in the operation S570 or the operation S580 may be determined with reference to the blur strength of the operation S530. When a user executes an imaging function, a result image to which the blur strength determined in the operation S570 or the operation S580 is applied may be generated (S590).

FIGS. 20, 21, 22 and 23 are various diagrams further illustrating operation of an electronic device according to an example embodiment.

Figure 20:
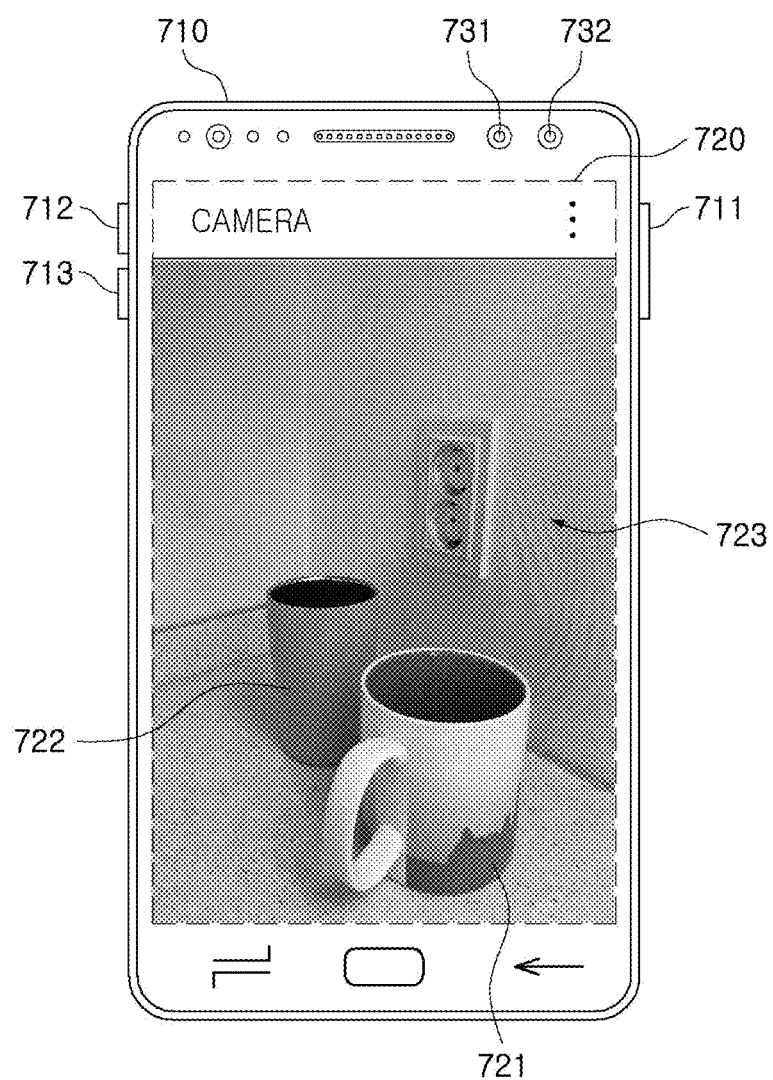
FIGS. 20, 21, 22 and 23 are respective diagrams illustrating operations of an electronic device according to an example embodiment of the inventive concept.
Figure 21:
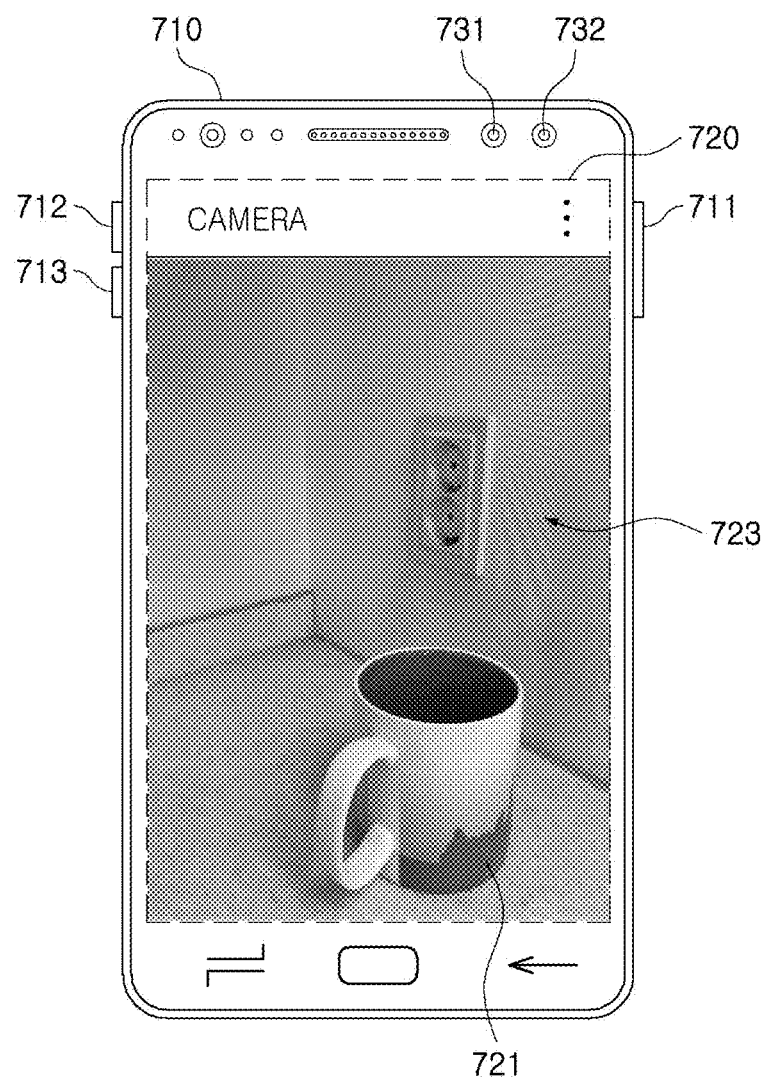

Referring to FIGS. 20 and 21, a preview image may be displayed on a display 720 in response to execution of a camera application of an electronic device 700. Two objects 721 and 722 are present on the preview image illustrated in FIG. 20, and the first object 721 may be disposed more adjacent to the electronic device 700 than the second object 722. When the objects 721 and 722 present in different distances from the electronic device 700 overlap each other and appear on the preview image, blur strength may be set to be weak by a machine learning model provided in the electronic device 700, and both of the objects 721 and 722 may be focused.

In the example embodiment illustrated in FIG. 21, the second object 722 may not be present on the preview image differently from the example illustrated in FIG. 20. As only the single object 721 is present in the example embodiment illustrated in FIG. 21, blur strength may be set to be strong by the machine learning model provided in the electronic device 700. Accordingly, as illustrated in FIG. 21, the object 721 may be focused, and a background 723 may be blurred such that a blur effect may be strong. As described with reference to FIGS. 20 and 21, a smart imaging function may be provided by the machine learning model of the electronic device 700.

In the example embodiment, an imaging parameter such as blur strength may be varied by simply changing the number and the positions of the objects 721 and 722 under the same field of view, the same illumination, the same aperture value, and others. However, the example embodiment described with reference to FIGS. 20 and 21 is merely an example, and an example embodiment thereof may be varied depending on images used for the learning operation of the machine learning model which provides the smart imaging function.

Figure 22:
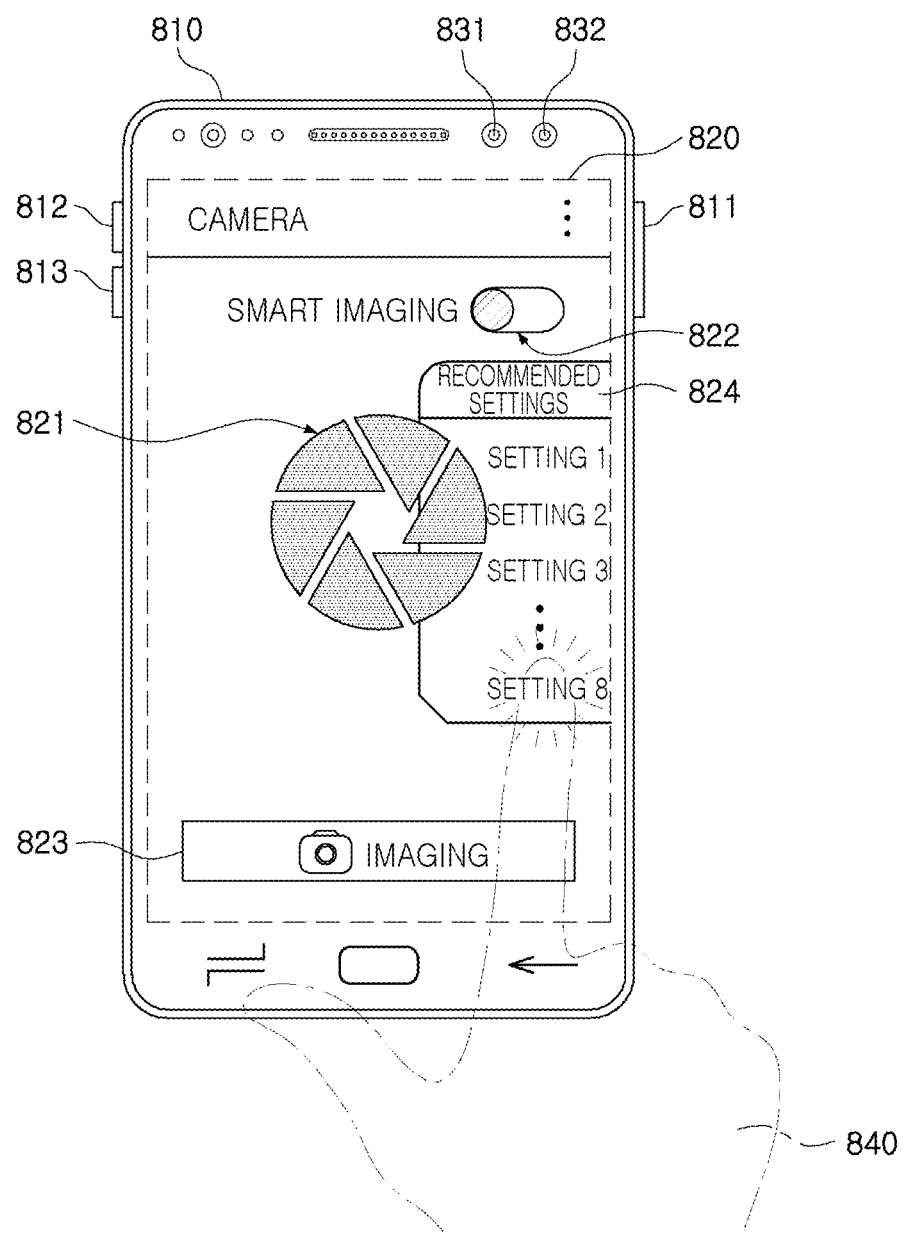

Referring to FIG. 22, a preview image may be displayed on a display 820 in response to execution of a camera application of an electronic device 800. On the preview image illustrated in FIG. 15, a first icon 821 having an aperture shape for intuitively displaying blur strength applied to a result image, a second icon 822 indicating whether a smart imaging function is activated, a third icon 823 corresponding to an imaging button, and other elements, may be displayed.

The electronic device 800 of FIG. 22 may provide recommended settings 824 received from a cloud to a user while the smart imaging function is activated. The recommended settings 824 may be settings received from a cloud server by the electronic device 800 with reference to feature information.

The recommendation settings 824 may be settings frequently selected by other users under conditions the same as or similar to the conditions under which the electronic device 800 obtains a current image, and may include blur strength, a color filter, and the like, which affect a result image. A user of the electronic device 800 may automatically set imaging parameters through a touch input 840 for selecting one of the recommendation settings 824, or may directly change blur strength and other element by generating an input for increasing or decreasing an opening area of the first icon 821 without consideration of the recommendation settings 824.

Figure 23:
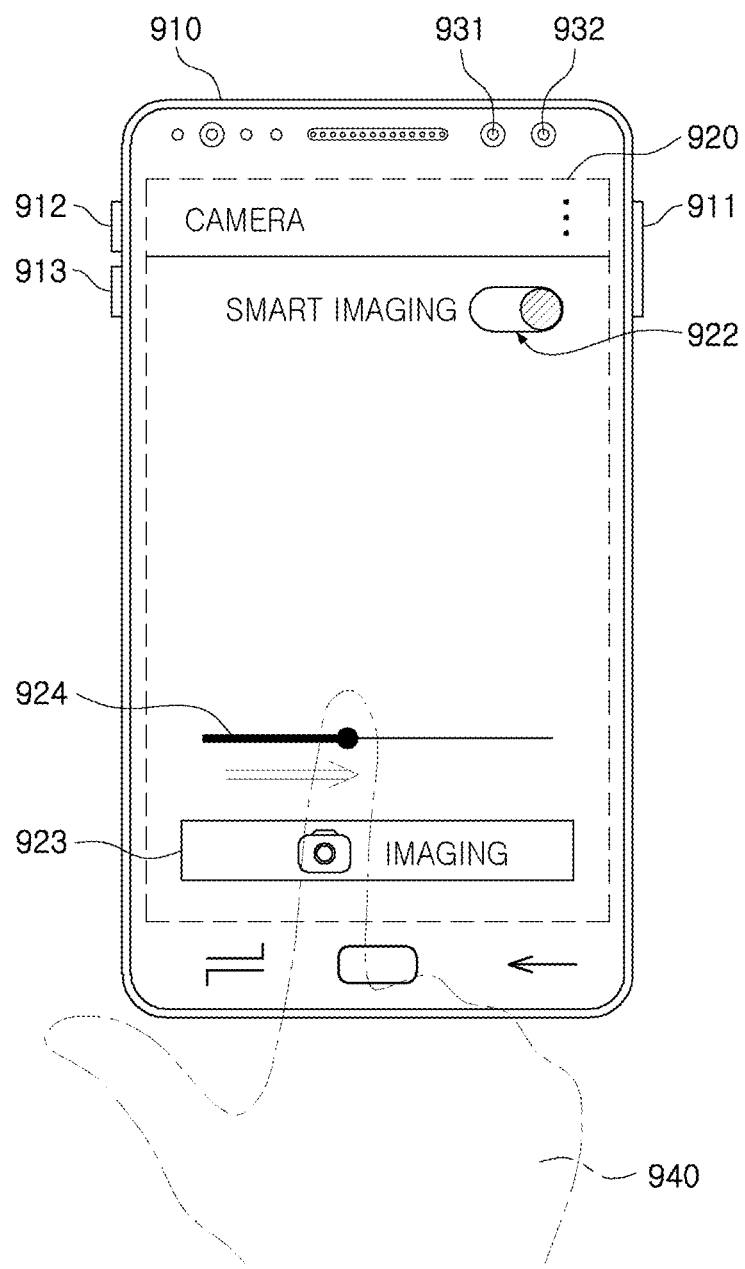

Referring to FIG. 23, a user may deactivate a smart imaging function on a preview image displayed on a display 920 of an electronic device 900. As an example, when the user inactivates the smart imaging function by touching the second icon 922, an icon having an aperture shape for displaying blur strength applied to a result image may disappear, differently from the example embodiments described above. When the smart imaging function is inactivated, the blur strength may be maintained as a value obtained right before the smart imaging function is inactivated. Alternatively, the electronic device 900 may automatically set blur strength with reference to the look-up table in which ambient illumination and blur strength determined in accordance with ambient illumination are stored.

As an example, when the smart imaging function is inactivated, a fourth icon 924 for adjusting blur strength may be additionally displayed as illustrated in FIG. 16. A user may adjust blur strength using a gesture input 940 for moving a bar of the fourth icon 924, and the blur strength may be adjusted by software without necessarily using the machine learning model stored in the electronic device 900.

According to the foregoing example embodiments, a preview image may be displayed in response to execution of a camera application, and a depth applied to a result image may be determined (or set) on the basis of various feature information, at least some of which may be extracted from the preview image. A depth applied to the result image may also or additionally be determined (or set) on the basis of user input associated with the preview image. Blur strength of a background included in the result image may be varied in accordance with the depth applied to the result image. Accordingly, an electronic device capable of providing a result image better conforming to personal user preferences may be obtained.

While the example embodiments have been shown and described above, it will be apparent to those skilled in the art that modifications and variations could be made without departing from the scope of the inventive concept as defined by the appended claims.

What is claimed is:

1. A method of operating an electronic device, the method comprising:
   extracting feature information from each of a plurality of images stored in a memory of the electronic device, the feature information including an input value, an illumination value and a blur strength of each of the plurality of images;
   training a machine learning model by applying the input values and the illumination values as input parameters of the machine learning model and comparing output values of the machine learning model with the blur strengths;
   displaying a preview image captured by an image sensor and extracting a first feature information of the preview image;

inputting the first feature information and a user input value into the trained machine learning model as first input parameters;
determining a first blur strength of the preview image based on a first output value of the trained machine learning model;
changing a blur strength of background of the preview image based on the determined first blur strength; and
capturing the preview image in which the blur strength of the background has the changed blur strength,
wherein the input value corresponds to a value for changing the blur strength of each of the plurality of images when each of the plurality of images is taken.

2. The method of claim 1, further comprising:
displaying an aperture icon having a shape of an analog aperture on the preview image,
wherein the user input value is changed according to an opening area of the aperture icon.

3. The method of claim 1, wherein an opening area of an aperture icon is changed by a user input.

4. The method of claim 3, wherein when the user input is a first multi-touch input for increasing a distance between at least two touch objects, the opening area of the aperture icon is increased, and
when the user input is a second multi-touch input for decreasing a distance between at least two touch objects, the opening area of the aperture icon is decreased.

5. The method of claim 3, wherein when the user input is a first touch input for moving in a first direction, the opening area of the aperture icon is increased, and
when the user input is a second touch input for moving in a second direction opposite to the first direction, the opening area of the aperture icon is decreased.

6. The method of claim 3, wherein when the opening area of the aperture icon is increased, the blur strength of the preview image is increased and a depth is set to be a shallow depth, and
when the opening area of the aperture icon is decreased, the blur strength of the preview image is decreased and a depth is set to be a deep depth.

7. The method of claim 1, wherein the feature information includes at least one of an object information and a background information represented in each of the plurality of images.

8. The method of claim 1, wherein the value for changing the blur strength of each of the plurality of images is represented in a numeral value as an aperture value.

9. A method of changing a blur strength of an image using an electronic device, the method comprising:
sensing an ambient illumination;
setting conversion gain of an image sensor based on the ambient illumination;
determining a first blur strength based on the sensed ambient illumination and the set conversion gain using a stored look-up table in a memory of the electronic device;
displaying a preview image based on the first blur strength;
inputting feature information extracted from the preview image and an user input value into a trained machine learning model;
determining a second blur strength of the preview image based on an output value of the trained machine learning model; and
capturing the image using the first blur strength or the second blur strength.

10. The method of claim 9, wherein the look-up table is stored by a manufacturer of the electronic device and the first blur strength is determined in accordance with the sensed ambient illumination and the set conversion gain.

11. The method of claim 10, wherein when a server communicatively connected with the electronic device updates the look-up table by referring to sample images generated by the electronic device and generates a new look-up table, the electronic device receives the new look-up table from the server.

12. The method of claim 9, wherein, as the sensed ambient illumination is darker, the conversion gain and the blur strength are increased.

13. The method of claim 12, wherein, as the sensed ambient illumination is brighter, the conversion gain and the blur strength are decreased.

14. The method of claim 9, further comprising:
displaying an aperture icon having a shape of an analog aperture on the preview image,
wherein the user input value is changed according to an opening area of the aperture icon.

15. The method of claim 14, wherein the opening area of the aperture icon is changed by a user input.

16. The method of claim 15, wherein when the user input is a first multi-touch input for increasing a distance between at least two touch objects, the opening area of the aperture icon is increased, and
when the user input is a second multi-touch input for decreasing the distance between at least two touch objects, the opening area of the aperture icon is decreased.

17. The method of claim 15, wherein when the user input is a first touch input for moving in a first direction, the opening area of the aperture icon is increased, and
when the user input is a second touch input for moving in a second direction opposite to the first direction, the opening area of the aperture icon is decreased.

18. The method of claim 15, wherein when the opening area of the aperture icon is increased, the second blur strength of the preview image is increased and a depth is set to be a shallow depth, and
when the opening area of the aperture icon is decreased, the second blur strength of the preview image is decreased and a depth is set to be a deep depth.

19. The method of claim 9, wherein the extracted feature information includes at least one of an object information and a background information represented in the preview image.

* * * * *